United States Patent

Kitahara et al.

[11] Patent Number: 5,273,266
[45] Date of Patent: Dec. 28, 1993

[54] RESERVING-TYPE ORIGINAL FEEDING APPARATUS

[75] Inventors: Makoto Kitahara; Yuji Takahashi, both of Tokyo; Noriyoshi Ueda, Yokohama, all of Japan

[73] Assignee: Canon Kabushiki Kaisha, Tokyo, Japan

[21] Appl. No.: 31,283

[22] Filed: Mar. 12, 1993

Related U.S. Application Data

[63] Continuation of Ser. No. 967,575, Oct. 28, 1992, abandoned, which is a continuation of Ser. No. 444,310, Dec. 1, 1989, abandoned.

[30] Foreign Application Priority Data

Dec. 2, 1988 [JP] Japan ................ 63-306250
Jun. 23, 1989 [JP] Japan ................ 1-162082
Jun. 23, 1989 [JP] Japan ................ 1-162083

[51] Int. Cl.$^5$ .................................. B65H 1/30
[52] U.S. Cl. .................................. 271/3.1; 271/9; 271/157; 271/171; 271/265; 271/301
[58] Field of Search ............ 271/3.1, 157, 171, 265, 271/301, 158, 159

[56] References Cited

U.S. PATENT DOCUMENTS

| | | | |
|---|---|---|---|
| 4,176,834 | 12/1979 | Takahashi | 271/116 |
| 4,229,650 | 10/1980 | Takahashi et al. | 250/223 R |
| 4,248,529 | 2/1981 | Sato et al. | |
| 4,390,175 | 6/1983 | Takahashi | 271/157 |
| 4,395,111 | 7/1983 | Takahashi et al. | 355/14 R |
| 4,466,006 | 8/1984 | Takahashi et al. | 346/153.1 |
| 4,486,015 | 12/1984 | Takahashi | 271/305 |
| 4,542,896 | 9/1985 | Takahashi | 271/111 |
| 4,544,148 | 10/1985 | Kitajima et al. | 271/3.1 |
| 4,598,323 | 7/1986 | Honjo et al. | 358/285 |
| 4,622,594 | 11/1986 | Honjo et al. | 358/293 |
| 4,627,709 | 12/1986 | Kitajima et al. | 355/14 SH |
| 4,660,957 | 4/1987 | Ueda et al. | 355/3 SH |
| 4,744,553 | 5/1988 | Hirose | 271/3.1 |
| 4,761,001 | 8/1988 | Hayakawa et al. | 271/3.1 |
| 4,769,674 | 9/1988 | Kitajima et al. | 355/14 SH |
| 4,819,023 | 4/1989 | Kitahara | |
| 4,849,796 | 7/1989 | Murakami | 271/3.1 X |
| 4,850,581 | 7/1989 | Hayakawa et al. | 271/10 |
| 4,866,536 | 9/1989 | Honjo et al. | 358/494 |
| 4,900,009 | 2/1990 | Kitahara et al. | 271/296 |

FOREIGN PATENT DOCUMENTS

| | | |
|---|---|---|
| 0254317 | 1/1988 | European Pat. Off. |
| 3545915A1 | 7/1986 | Fed. Rep. of Germany |
| 3709639 | 11/1987 | Fed. Rep. of Germany |
| 3631129 | 3/1989 | Fed. Rep. of Germany |
| 58-166361 | 10/1983 | Japan |
| 60-163052 | 8/1985 | Japan |
| 8804798 | 6/1988 | PCT Int'l Appl. |

OTHER PUBLICATIONS

Xerox Disclosure Journal, vol. 11, No. 2, Mar./Apr. 1986, p. 89; W. A. Henry, II: "Automatically Set Side Guides For Document Feeder".

*Primary Examiner*—Richard A. Schacher
*Attorney, Agent, or Firm*—Fitzpatrick, Cella, Harper & Scinto

[57] ABSTRACT

The present invention provides a reserving type original feeding apparatus comprising a circulating original feeding portion having a first stack tray on which originals are supported, a first separating/supplying means unit for separating and supplying the originals supported in the first stack tray one by one from the bottom, an introduction sheet path for introducing the original supplied by the first separating/supplying unit to a processing portion, and an ejection sheet path for introducing the original processed by the processing portion to the first supply tray from the processing portion; a reserving original feeding portion having a second stack tray on which originals are supported, a second separating/supplying unit for separating and supplying the originals supported in the second stack tray one by one from the bottom, and a second introduction sheet path for introducing the original supplied by the second separating/supplying unit to the processing portion; an original ejector tray arranged substantially above the processing portion; and a second ejection sheet path for introducing the original processed by the processing portion to the original ejector tray from the processing portion. The present invention further provides an image forming system including the above-mentioned original feeding apparatus and further including an image forming portion for forming an image corresponding to an original image and a feeding unit for feeding a sheet material to the image forming portion.

43 Claims, 11 Drawing Sheets

A PORTION TRAY

B PORTION TRAY

RESERVING-TYPE ORIGINAL FEEDING APPARATUS

This application is a continuation-in-part of application Ser. No. 07/967,575 filed Oct. 28, 1992, now abandoned; which was continuation of application Ser. No. 07/444,310, filed Dec. 1, 1989, now abandoned.

BACKGROUND OF THE INVENTION

1. Field of the Invention

The present invention relates to an original feeding apparatus incorporated into an image forming system such as a copying machine, and more particularly it relates to an original feeding apparatus wherein an original set in a predetermined position is fed to a predetermined processing station and then is ejected out of the image forming system.

2. Related Background Art

In a conventional original feeding apparatus used with a copying machine and the like, until an operator has finished the treatment processes of his originals by using the original feeding apparatus, any other operators could not use the same original feeding apparatus. In fact, it is a practice that a number of persons must form a line to await for their turn for using the original feeding apparatus. However, it is apparent that such circumstances are very inefficient and time-consuming.

In view of the above, original feeding apparatuses wherein one of more "original groups" (each of which means a group of originals that are to be treated in the same copying condition) are previously set on an original support and the original groups are automatically and successively treated in accordance with the respective treating conditions requested for the respective original groups have been proposed. Such an apparatus is called as a "reserving type original feeding apparatus" and is constituted as shown in FIGS. 1 and 2. The construction shown in FIG. 1 is fully described in the Japanese Patent Laid-Open No. 62-65842 (corresponding to U.S. Ser. No. 905,935) and the construction shown in FIG. 2 is fully described in the Japanese Patent Laid-Open No. 62-222939 (corresponding to the U.S. Pat. No. 4,819,023 patented on Apr. 4, 1989).

In the original feeding apparatus shown in FIG. 1, a group of originals set on a tray 201 in an A portion (reserving portion) with the surface to be copied faced up are separated one by one from the bottom and the separated original is passed through paths (a), (b), (c), (d), (f), (i) and (j) and is fed to a tray 221 in a B portion (circulating portion). In the B portion, predetermined original reading processes are repeated a predetermined number of times through an original circulating movement (221→g→f→h→i→j→221→g→f→h→i→j→221 . . . ), and, after the processes have been completed, the original is moved from the tray 221 in the B portion through the paths (g), (f), (d), (b), (c) and (e) to an ejector tray 230 and is ejected thereon with the above-mentioned surface facing up. When the above-mentioned treatment regarding one original group has been completed, a similar treatment regarding the next original group situated on the tray 201 in the A portion is performed in the same manner. In this way, it is possible to continuously treat a plurality of original groups.

In the original feeding apparatus shown in FIG. 2, a group of originals set on a tray 301 in an A portion with the surface to be copied facing up are separated one by one from the bottom and the separated original is passed through paths (a), (b), (f), (h), (i), (j), (k), (l), (m), (h), (f), (h), (i) and (j) and is fed to a tray 321 in a B portion. In the B portion, predetermined original reading processes are repeated a predetermined number of times through an original circulating movement, and, after the processes have been completed, the original is moved from the tray 321 in the B portion through the paths (g), (f), (h), (i), (j), (k), (1), (m), (h), (f), (b) and (c) to an ejector tray 330 and is ejected thereon with the above-mentioned surface faced upside. When the above-mentioned treatment regarding one original group has been completed, as similar to FIG. 1, a similar treatment regarding the next original group situated on the tray 301 in the A portion is performed in the same manner. In this way, it is possible to continuously treat a plurality of original groups.

However, in the above-mentioned conventional original feeding apparatuses shown in both FIG. 1 and FIG. 2, since they each includes two trays one of which is the supply tray 201 or 301 in the A portion and the other of which is the ejector tray 230 or 330, the number of protruding portions projecting from the apparatus are increased, thus making the apparatus large. Further, since the ejector tray 230, 330 is disposed below the supply tray 201, 301, it was difficult to pick up or remove the ejected originals and to confirm the ejected original and/or the ejecting operation.

Further, in the example of FIG. 1, since the path in the A portion is complicated, if the original is jammed, the jam recovery treatment will be difficult. In addition, since the switch-back operation must be performed in the paths (b), (c) and (e) when the original is fed back from the B portion to the A portion, it takes a long time for feeding back the original from the tray 221 of the B portion.

On the other hand, in the example of FIG. 2, it is necessary that the originals must be turned over not to change the order of the originals when they are fed back from the B portion to the A portion through the paths (h), (i), (j), (k), (1), (m) and (h). Consequently, it takes a long time for feeding back the original.

Further, in the above-mentioned conventional original feeding apparatuses shown in both FIG. 1 and FIG. 2, as to a plurality of original groups, it is so designed that the original is fed from the supply tray 201 or 301 of the A portion to the tray 221 or 321 of the B portion and, after the original has been processed in the B portion, it is fed back to the ejector tray 230 or 330 of the A portion; whereas, as to the single original group, it is so designed that the original group is directly set in the tray 221 or 321 of the B portion and, after the original has been processed in the B portion, it is fed back to the tray 221 or 321 of the B portion. Accordingly, the construction regarding the plurality of original groups is independent from that regarding the single original group, and, therefore, the relation between the A portion and the B portion was not fully considered.

For example, the case where the originals are set on the tray 201 or 301 of the A portion during the treatment of one original group in the B portion was not considered. Further, in view of various combinations, there arises inconvenience in the feeding of the original from the A portion to the B portion and/or in the feeding of the original from the B portion to the ejector tray 230 or 330.

Furthermore, in the above-mentioned conventional apparatuses shown in both FIG. 1 and FIG. 2, if the sizes of the originals are different from each other, there will arise a problem that the original cannot be fed advantageously when the originals are fed from the reserving original supply portion (A portion) to the original circulating portion (B portion). That is to say, when all of the originals have the same size and lateral regulating guides in the A and B portions are adjusted to have a width corresponding to the size of the original, the originals are fed from the A portion to the B portion without trouble; but, if, during the treatment of the original in the B portion, the originals having different size are set in the A portion, problems will occur.

For example, it is assumed that the original group including the originals having B5 size are processed in the B portion.

The tray 221 or 321 of the B portion has lateral regulating guides for preventing the original from shifting in a direction perpendicular to an original feeding direction. Now, it is assumed that the originals having A4 size are set in the tray 201 or 301 of the A portion. In this case, when the original (A4 size) in the A portion is fed to the B portion after the treated original group in the B portion has been ejected onto the ejector tray, since the movement of the original is obstructed by the lateral regulating guides (set to have the B5 size width), the original will be jammed.

To the contrary, if the originals having A4 size are set in the B portion and the originals having B5 size are set in the A portion, the distance between the lateral regulating guides in the B portion will be wider than the width of the original fed from the A portion, with the result that there will arise a problem that the lateral regulating guides could not prevent the lateral movement of the original.

SUMMARY OF THE INVENTION

An object of the present invention is to eliminate the above-mentioned drawbacks in conventional reserving type original feeding apparatuses having a plurality of independent original feeding means.

More specifically, mainly in consideration of the compactness of the apparatus, an object of the present invention is to provide a compact reserving type original feeding apparatus without losing the function of a conventional original circulating means.

Further, mainly in consideration of the operability and reliability of the apparatus, another object of the present invention is to provide a reserving type original feeding apparatus which can smoothly perform the feeding of an original group from an original reserving portion to an original circulating portion and the selection of ejector trays for receiving the original ejected from the original circulating portion.

Further, similarly, in consideration of the operability and reliability of the apparatus, a further object of the present invention is to provide a reserving type original feeding apparatus which can prevent the jamming of originals even if the size of originals set in an original reserving portion is different from the size of originals set in an original circulating portion.

In order to achieve the above-mentioned objects, by providing a common original ejector tray above an original processing portion, it is possible to obtain a reserving type original feeding apparatus wherein the ejector tray does not protrude from the apparatus, the ejected original can be easily confirmed to have been processed and the original can be fed from the original circulating portion to the ejector tray in a short time.

Further, in order to achieve the above objects, there is provided a reserving type original feeding apparatus wherein original feeding paths can be shorter and the waiting time between one treatment and the next treatment is reduced to improve the productivity, by smoothly performing the feeding of the original group from an original reserving portion to an original circulating portion and the selection of ejector trays for receiving the original fed from the original circulating portion.

Further, in order to achieve the above objects, by comparing a width LA of a second regulating guide (movable guide) detected in the original reserving portion with a width LB of a first regulating guide (movable guide) detected in the original circulating portion and by permitting the feeding of the original from the original reserving portion to the original circulating portion when the width LA is equal to the width LB, the original fed to the original circulating portion can be prevented from jamming. In addition, by controlling the movement of the first regulating guide of the original circulating portion in such a manner that the width LA becomes equal to the width LB, the jamming of the original can be prevented even if the size of the original set in the original reserving portion differs from the size of the original set in the original circulating portion, thus providing the reserving type original feeding apparatus which can prevent the lateral movement of the original being fed and is reliable.

DESCRIPTION OF THE PREFERRED EMBODIMENTS

The present invention will now be explained in connection with embodiments thereof with reference to the accompanying drawings.

Figure 3:
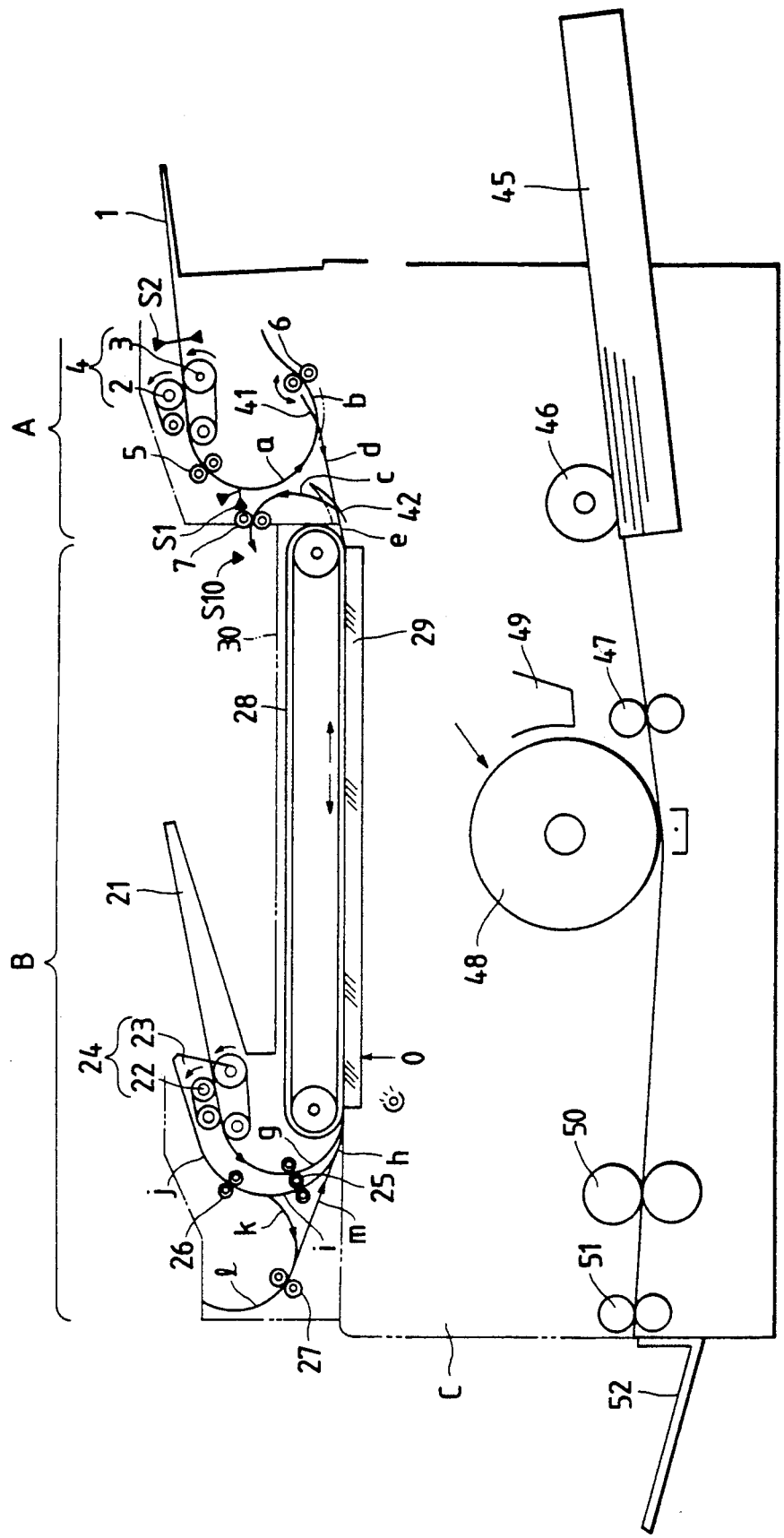
FIG. 3 is an elevational sectional view of an original feeding apparatus according to a preferred embodiment of the present invention.

FIG. 3 shows, in an elevational section, a reserving type original feeding apparatus according to an embodiment of the present invention which includes a reserved original feeding portion A and an original circulating portion B. The apparatus is adopted to an image forming system C (Incidentally, in this case, the original circulating portion B includes an original turn-over path, but it may not include such turn-over path).

First of all, the reserved original feeding portion, i.e., original reserving portion A will be explained.

This portion includes a supply tray (second stack tray) 1 into which an original group (a group of originals) is set, and a separating belt means 2 and supply belt means 3 which are arranged downstream of the supply tray and can separate the originals one by one from the bottom of the original group by rotating in directions shown by the arrows, respectively. The separating belt means 2 and the supply belt means 3 constitute a separating/supplying portion (second separating/supplying means) 4.

Downstream of the separating/supplying portion 4, sheet paths (a), (b) (third sheet path) extend downwardly to turn over the original, and pairs of rollers 5, 6 are provided for feeding the original in the sheet paths (a), (b). Sheet paths (d), (e) (fourth sheet path) are branched from the third sheet path (a)-(b) in a switch-back direction to reach a platen 29 in a treating portion of the image forming system. Further, a sheet path (fifth sheet path) (c) is branched from the fourth sheet path (d), (e) in the switch-back direction to extend toward an ejector tray 30 in the original circulating portion B. A pair of rollers 7 are provided for feeding the original in the sheet path (c).

In the illustrated embodiment, while the sheet paths (a), (b) extend downwardly of the tray 1 to turn over the original, such sheet paths may be extended upwardly of the tray to turn over the original.

A flexible deflector plate 41 is provided at the junction between the sheet paths (a), (b) and (d), whereby the original is fed from the sheet path (a) to the sheet path (b) while pushing the deflector plate 41 down (toward a two-dot and chain position) and the original is positively switched back from the sheet path (b) to the sheet path (d) by the deflector plate 41 returned to a position shown by the solid line. Similarly, a flexible deflector plate 42 is provided at the junction between the sheet paths (d), (e) and (c).

Further, a second sensor S2 for detecting the original from the tray 1 and a first sensor S1 for detecting the original in the sheet path (a) and for reading a marking on a partition paper are also provided.

Further, in FIG. 3, the reference numeral 45 designates a cassette; 46 designates a sheet supply roller; 47 designates registration rollers; 48 designates a photosensitive drum; 49 designates a developing device; 50 designates a fixing device; 51 designates ejector rollers; and 52 designates an ejector tray.

Next, the original circulating portion B will be explained.

This portion B includes an original supply tray (first stack tray) 21 into which a group of originals are set, and a separating belt means 22 and supply belt means 23 which are arranged downstream of the supply tray and can separate the originals one by one from the bottom of the original group by rotating in directions shown by the arrows, respectively. The separating belt means 22 and the supply belt means 23 constitute a separating/supplying portion (first separating/supplying means) 24.

Downstream of the separating/supplying portion 24, a sheet path (g) (first sheet path) extend downwardly of the tray 21 to turn over the original in contiguous to the platen 29 of the processing portion of the system. A white surface belt 28 is arranged in confronting relation to the platen 29, which belt 28 can convey the original on the platen 29.

Further, sheet paths (h), (i), (j) (second sheet path) are extend upwardly from the platen 29 to turn over the original toward the tray 21. In addition, pairs of rollers 25, 26 are provided for feeding the original in the second sheet path (h)-(j), and sheet paths (k), (1), (m) for turning over the original and a pair of rollers 27 associated therewith are also provided. The junctions between the respective sheet paths are constituted in the same manner as those in the A portion as mentioned above, and an upper surface 30 facing to the platen 29 constitutes an ejector tray.

Figure 4:
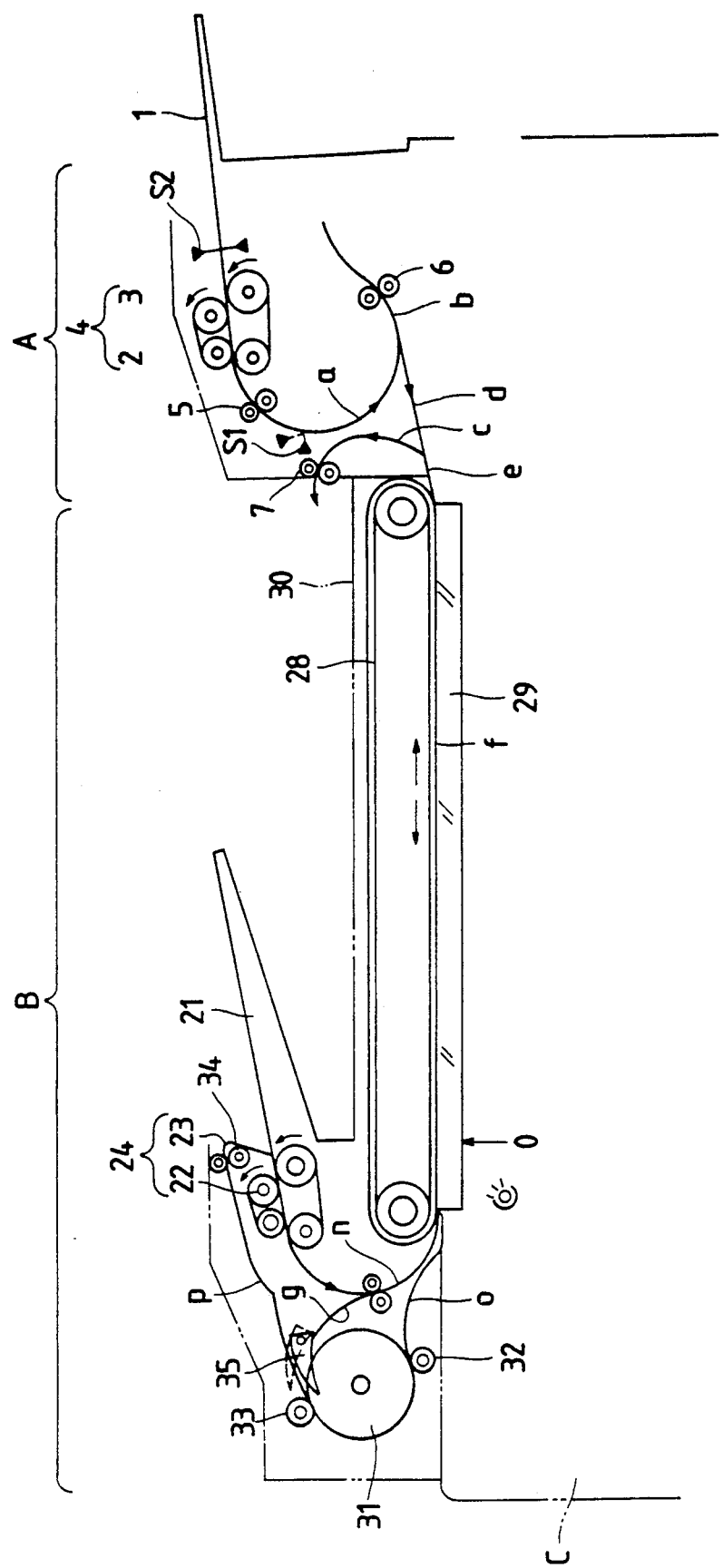
FIG. 4 is an elevational sectional view of an original feeding apparatus according to another embodiment of the present invention.

Incidentally, as shown in FIG. 4, in the original circulating portion B the sheet paths for turning over the original may form a closed loop turning over path (o→31→q), in place of the two switch-back configurations as shown in FIG. 3.

In FIG. 4, a first sheet path (n) is arranged to direct the original separated by the separating/supplying portion 24 to the platen 29 of the processing portion of the image forming system C. Further, sheet paths (o), (p) (second sheet path) are extended upwardly from the platen 29 to turn over the original along a periphery of a large roller 31 toward the tray 21. Further, in order to feed or move the original in the respective sheet paths, rollers 32, 33 are arranged on the large roller 31 and ejector rollers 34 are also arranged. In addition, the sheet path (q) for turning over the original is branched from the sheet path (o) to be in contiguous to the platen 29. A deflector plate 35 is provided at the junction between the sheet paths (p) and (q) to change over the sheet paths.

Figure 5:
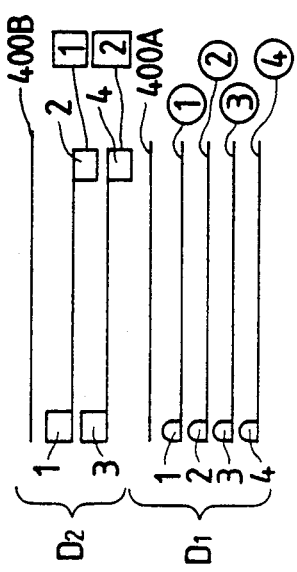
FIG. 5 is an explanatory view for explaining the stacking of originals.

In operation, as shown in FIG. 5, an example that the original group $D_1$ including first to fourth pages ①-④ of originals each having image information written on only one surface thereof (referred to as "single surface original" hereinafter) and the original group $D_2$ including first to fourth pages 1-4 of originals each having image information written on both surfaces thereof (referred to as "double surface original" hereinafter) are processed or treated will be explained.

On each original group, a partition paper 400A, 400B (FIG. 5) for setting the mode of the respective original group and for separating the original groups from each other is arranged. In this case, the marking is provided on the upper surface of each partition paper. As shown, the single surface originals are stacked in order in such a manner that the youngest page ① is positioned in the uppermost position and the oldest page ④ is positioned in the lowermost position and such that the surface on which the image information is written faces upwardly; whereas, the double surface originals are stacked in order in such a manner that the youngest page [1] is positioned in the uppermost position. Further, the partition papers 400A and 400B for setting the processing modes of the original groups $D_1$ and $D_2$, respectively are positioned on the respective original groups $D_1$, $D_2$, respectively, with the markings thereof faces upwardly. These stacks of original groups are further stacked each other and disposed on the tray 1 of the A portion (Incidentally, in the illustrated embodiment, while the setting of the processing mode of each original group and the separation between the adjacent original groups are effected by the partition papers, the separation between the adjacent original groups may be effected by partition levers arranged in the vicinity of the tray 1 and the setting of the mode may be effected by inputting the mode information from an control panel of the image forming system).

(A) The processing of the single surface original group D:

(A-1) The original group is set, and a start button (not shown) provided in the image forming system C is depressed.

(A-2) The lowermost original ④ is separated from the original group by means of the separating/supplying portion ④.

(A-3) The original ④ is passed through the sheet paths (a), (b), (d), (e), (f), (h), (i) and (j) in order and is received in the tray 21 with the image surface facing up.

(A-4) Similarly, the originals ③, ②, ① are successively separated from the original group and are received in the tray 21.

(A-5) The partition paper 400A is removed, and is moved in the sheet path (a).

(A-6) The partition paper is detected and at the same time the marking thereof is read by the sensor S1 arranged in the sheet path (a), thus determining the processing mode of the original group $D_1$.

(A-7) The partition paper 400A is passed through the sheet paths (a), (b), (d), (e), and then passed through the switch back mechanism and lastly passed through the sheet path (c) in order, and, accordingly, the partition paper is not ejected on the ejector tray of the B portion.

(A-8) The processing of the originals in the tray 21 is started in accordance with the processing mode determined by the partition paper 400A.

(A-9) The lowermost original ④ is separated from other originals by means of the separating/supplying portion 24.

(A-10) The original ④ is passed through the sheet paths (g), (f) and then passed through the reading portion and then passed through the sheet paths (h), (i), (j) to return to the tray 21.

(A-11) Similarly, the originals ③, ②, ① are brought into the above process (A-10) successively, and are returned to the tray 21.

(A-12) The above processes (A-10), (A-11) are repeated a predetermined number of times for each of the originals ④, ③, ②, ① in accordance with the processing mode.

(A-13) The originals ④, ③, ②, ① are fed from the tray 21 successively and are passed through the sheet paths (g), (f), (e), (c) in order and are ejected into the ejector tray 30 with the image surface facing up. At this point, the originals are stacked into the tray 30 in the same order as in the tray 1. In this way, the processing of the original group $D_1$ has been completed (In the illustrated embodiment, while an example that the originals are ejected onto the tray 30 after the predetermined numbers of the circulation of the originals have been completed was explained, each original may be returned to the tray 30 without returning to the tray 21 in the last circulating cycle. That is to say, only in the last circulating cycle, each original may be fed from the tray 21 and passed through the sheet paths (g), (f) and then passed through the reading portion and then passed through the sheet paths (e), (c) to reach the tray 30).

(B) The processing of the double surface originals group $D_2$.

(B-1) After the original group $D_1$ has been ejected onto the tray 30, the double surface originals ②, ① are sent to the tray 21 successively in accordance with the above-mentioned processes (A-2), (A-3), (A-4).

(B-2) The marking of the partition paper 400B is read in accordance with the above-mentioned processes (A-5), (A-6), thus determining the processing mode of the original group $D_2$.

(B-3) The partition paper 400B is ejected onto the original group $D_1$ in the ejector tray 30 in accordance with the above-mentioned process (A-7).

(B-4) The processing of the original group $D_2$ is started according to the processing mode thereof determined by the partition paper 400B.

(B-5) The lowermost original ② is separated from the original group, and then is passed through the sheet paths (g), (f), (h), (i), (j), (k), (l), (m), (h), (f) in order, and then is passed through the reading portion for the ④ page, and then is passed through the sheet paths (h), (i), (j), (k), (l), (m), (h), (f) in order, and then is passed through the reading portion for the ③ page, and then is passed through the sheet paths (h), (i), (j) to return the tray 21.

(B-6) Similarly, the original ① is also passed through the sheet paths (g), (f), (h), (i), (j), (k), (l), (m), (h), (f) in order, and then is passed through the reading portion for the ② page, and then is passed through the sheet paths (h), (i), (j), (k), (l), (m), (h), (f) in order, and then is passed through the reading portion for the ① page, and then is passed through the sheet paths (h), (i), (j) to return the tray 21.

(B-7) The above-mentioned processes (B-5), (B-6) are repeated a predetermined number of times in accordance with the processing mode determined by the partition paper 400B.

(B-8) As similar to the above-mentioned process (A-13), the original group $D_2$ is ejected onto the partition paper 400A for the original group $D_1$ stacked in the tray 30 in the same order as in the tray 1 (Also in this case, as mentioned in the above (A-13), in the last circulating cycle, the originals may be ejected into the tray 30 after the reading operation of the respective originals has been completed). In this way, the processing of the original group $D_2$ is completed.

After the processing of all of the original groups $D_1$, $D_2$ has been completed, the second sensor S2 detects the fact that there is no original in the tray 1, thus completing the processing operation.

The originals after being processed are received in the ejector tray 30, and since the stacked order of the originals in the tray 30 is the same as the stacked order of the originals when they have been set, the re-arranging operation for the pages of the originals can be omitted. Further, since the partition paper exists between the original groups $D_1$ and $D_2$, any original group can be easily separated from the other original groups. In addition, as to the copied papers, since they are ejected in the order same as the order of the set originals, a further treatment of the copied sheets can be very convenient.

Next, a further embodiment of the present invention will be explained with reference to FIG. 6.

Figure 1:
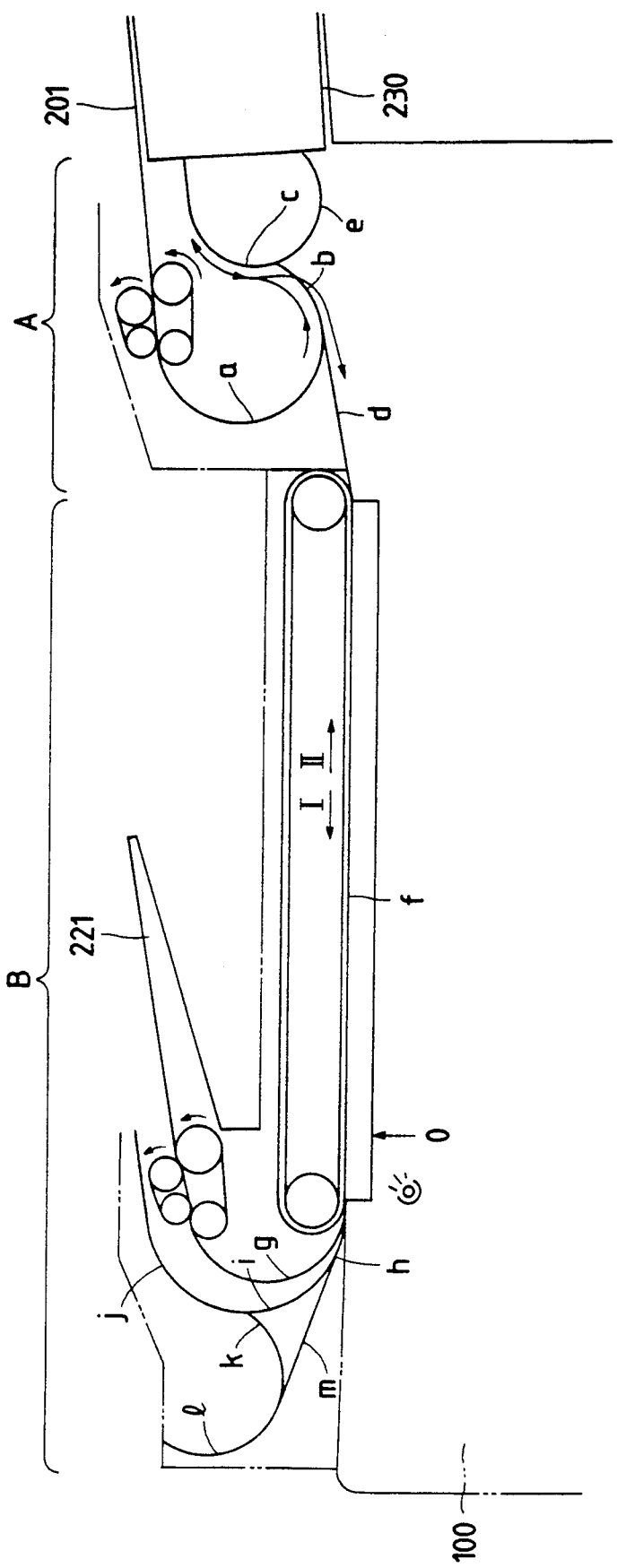
FIGS. 1 and 2 are schematic elevational sectional views showing conventional original feeding apparatuses, respectively.
Figure 6:
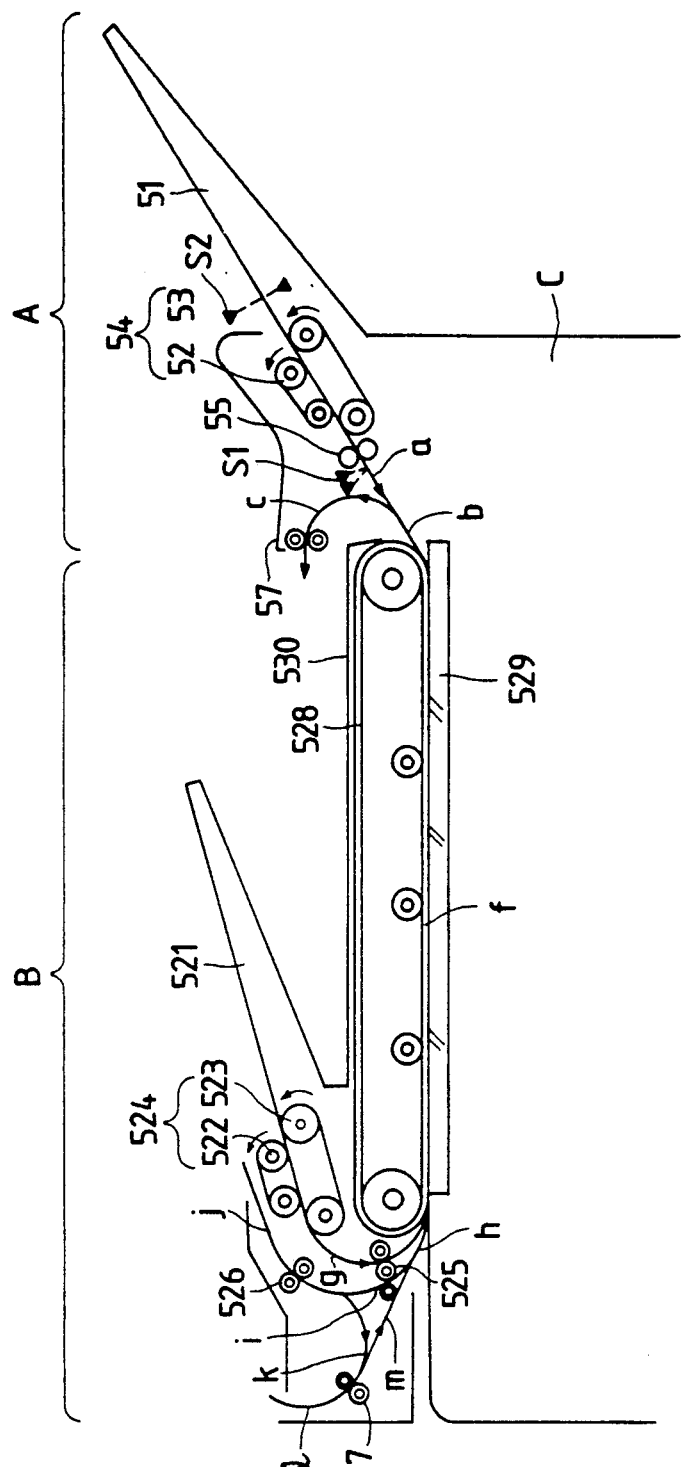
FIG. 6 is an elevational sectional view of an original feeding apparatus according to a further embodiment of the present invention.

FIG. 6 is an elevational sectional view showing a reserving original feeding apparatus according to a further embodiment of the present invention, which includes an original reserving portion A and an original circulating portion B, as in the embodiment of FIG. 1. Further, the apparatus is adapted to an image forming system C (Incidentally, also in this embodiment, while a turn-over path is constituted by a switch-back path, it may be constituted by appropriate turn over rollers).

First of all, an original reserving portion A will be explained. This portion A includes an original supply tray (second stack tray) 51 into which an original group is set, and a separating belt means 52 and supply belt means 53 which are arranged downstream of the supply tray and can separate the originals in the tray 51 one by one from the bottom of the original group by rotating in directions shown by the arrows, respectively. The separating belt means 52 and the supply belt means 53 constitute a separating/supplying portion (second separating/supplying means) 54.

Downstream of the separating/supplying portion 54, sheet paths (a), (b) (third sheet path) extend so as to be contiguous to the platen 529 of the processing portion of the image forming system. A pair of rollers 55 are provided for feeding the original in the sheet paths (a), (b). A sheet path (c) (fourth sheet path) is branched from the third sheet path (a)-(b) in a switch-back direction to extend toward an ejector tray 530 on the original circulating portion B. Further, a pair of rollers 57 are provided for feeding the original in the sheet path (c). The junction between the sheet paths is constituted in the same manner as those of FIG. 1, and includes a flexible deflector plate. Further, a second sensor S2 for detecting the original from the tray 51 and a first sensor S1 for detecting the original in the sheet path (a) and for reading a marking on a partition paper are also provided.

Next, the original circulating portion B will be explained (this portion has the same construction as that shown in FIG. 3 and similar elements have the same numbers except that 500 has been added thereto.

This portion B includes an original stack tray (first supply tray) 521 into which a group of originals are set, and a separating belt means 522 and supply belt means 523 which are arranged downstream of the supply tray and can separate the originals in the tray 521 one by one from the bottom of the original group by rotating in directions shown by the arrows, respectively. The separating belt means 522 and the supply belt means 523 constitute a separating/supplying portion (first separating/supplying means) 524.

Downstream of the separating/supplying portion 524, a sheet path (g) (first sheet path) extends downwardly of the tray 521 to turn-over the original and is contiguous to the platen 529 of the processing portion of the system. A white surface belt 528 is arranged in confronting relation to the platen 529, which belt 528 can convey the original on the platen 529. Further, sheet paths (h), (i), (j) (second sheet path) extend upwardly from the platen 529 to turn over the original toward the tray 521. In addition, pairs of rollers 525, 526 are provided for feeding the original in the second sheet path (h)-(j), and sheet paths (k), (l), (m) (turn-over path) for turning over the original and a roller pair 527 for conveying the originals in each path are provided.

The junctions between the respective sheet paths are constituted in the same manner as those in the A portion as mentioned above, and an upper surface faced to the platen 529 constitutes an ejector tray.

Figure 7:
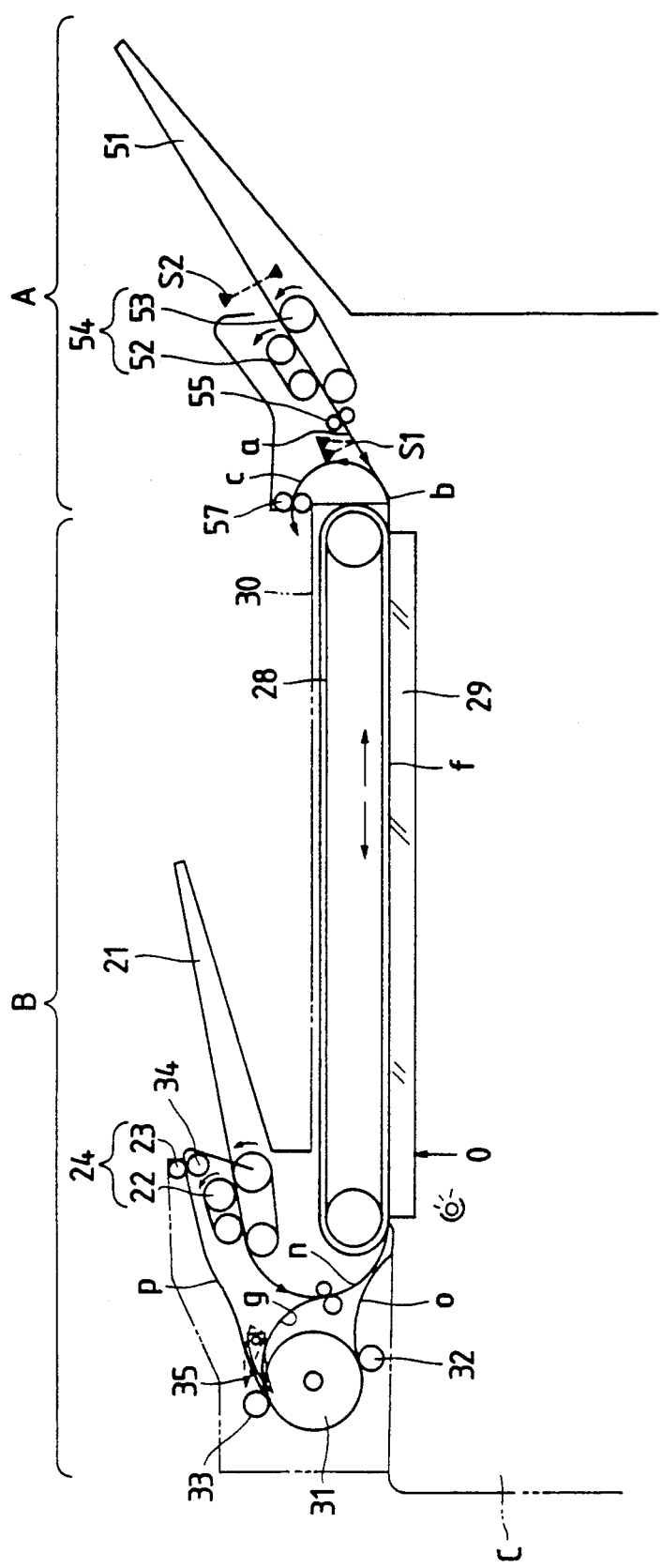
FIG. 7 is an elevational sectional view of an original feeding apparatus according to a still further embodiment of the present invention.

Incidentally, FIG. 7 shows an original circulating portion B similar to that of FIG. 4.

In operation, an example that the original group, including first to fourth pages $\boxed{1}$-$\boxed{4}$ of originals each having image information written on only one surface thereof, (referred to as "single surface original" hereinafter) and the original group D$_2$ including first to fourth pages - of originals each image information written on both surfaces thereof (referred to as "double surface original" hereinafter), are processed, will be explained.

On each original group, a partition paper 400A, 400B (FIG. 5) for setting the mode of the respective original group and for separating the original groups from each other is arranged. In this case, the marking is provided on the upper surface of each partition paper. As shown, the single surface originals are stacked in order in such a manner that the youngest page ① is positioned in the uppermost position and the oldest page ④ is positioned in the lowermost position and such that the surface on which the image information is written faces up; whereas, the double surface originals are stacked in order in such a manner that the youngest page $\boxed{1}$ is positioned in the uppermost position. Further, the partition papers 400A and 400B for setting the processing modes of the original groups D$_1$ and D$_2$, respectively are positioned on the respective original groups D$_1$, D$_2$, respectively, with the markings thereof facing up. These stacks of original groups are further stacked on each other and are disposed on the tray 51 of the A portion (Incidentally, in the illustrated embodiment, while the setting of the processing mode of each original group and the separation between the adjacent original groups are effected by the partition papers, the separation between the adjacent original groups may be effected by partition levers arranged in the vicinity of the tray 51 and the setting of the mode may be effected by inputting the mode information from an control panel of the image forming system).

(C) The processing of the single surface original group D$_1$:

(C-1) The original group is set, and a start button (not shown) provided in the image forming system C is depressed.

(C-2) The lowermost original ④ is separated from the original group by means of the separating/supplying portion 54.

(C-3) The original ④ is passed through the sheet paths (a), (b), (f), (h), (i), (j), (k), (l), (m), (h), (g), (h), (i) and (j) in order and is received in the tray 521 with the image surface facing up.

(C-4) Similarly, the originals ③, ②, ① are successively separated from the original group and are received in the tray 521.

(C-5) The partition paper 400A is removed, and is moved in the sheet path (a).

(C-6) The partition paper is detected and at the same time the marking thereof is read by the sensor S1 arranged in the sheet path (a), thus determining the processing mode of the original group D$_1$.

(C-7) The partition paper 400A is passed through the sheet paths (a), (b), (c) to be ejected in the ejector tray 530 of the B portion. Accordingly, the partition paper is not fed to the B portion.

(C-8) The processing of the originals in the tray 521 is started in accordance with the processing mode determined by the partition paper 400A.

(C-9) The lowermost original ④ is separated from other originals by means of the separating/supplying portion 524.

(C-10) The original ④ is passed through the sheet paths (g), (f) and is then passed through the reading portion and is then passed through the sheet paths (h), (i), (j) to return to the tray 521.

(C-11) Similarly, the originals ③, ②, ①, are brought into the above process (C-10) successively, and are returned to the tray 521.

(C-12) The above processes (C-10), (C-11) are repeated by predetermined times in accordance with the processing mode.

(C-13) The originals ④, ③, ②, ① are fed from the tray 521 successively and are passed through the sheet paths (g), (f), (b), (c) in order and are ejected into the ejector tray 530 with the image surface facing up. At this point, the originals are stacked into the tray 530 in the same order as in the tray 1. In this way, the processing of the original group $D_1$ has been completed (In the illustrated embodiment, while an example that the originals are ejected onto the tray 530 after a predetermined number of circulations of the originals have been completed was explained, each original may be returned to the tray 530 without returning to the tray 521 in the last circulating cycle. That is to say, only in the last circulating cycle, each original may be fed from the tray 521 and passed through the sheet paths (g), (f) and then passed through the reading portion and then passed through the sheet paths (b), (c) to reach the tray 530).

(D) The processing of the double surface original group $D_2$:

(D-1) After the original group $d_1$ has been ejected onto the tray 530, the double surface originals ②, ① are sent to the tray 21 successively in accordance with the above-mentioned processes (C-2), (C-3), (C-4).

(D-2) The marking of the partition paper 400B is read in accordance with the above-mentioned processes (C-5), (C-6), thus determining the processing mode of the original group $D_2$.

(D-3) The partition paper 400B is ejected onto the original group $D_1$ in the ejector tray 530 in accordance with the above-mentioned process (C-7).

(D-4) The processing of the original group $D_2$ in the tray 521 is started according to the processing mode thereof determined by the partition paper 400B.

(D-5) The lowermost original ② is separated from the original group by means of the separating/supplying portion 524, and then is passed through the sheet paths (g), (f), (h), (i), (j), (k), (l), (m), (h), (f) in order, and then is passed through the reading portion for the ④ page, and then is passed through the sheet paths (h), (i), (j), (k), (l), (m), (h), (f) in order, and then is passed through the reading portion for the ③ page, and then is passed through the sheet paths (h), (i), (j) to return the tray 521.

(D-6) Similarly, the original ① is also passed through the sheet paths (g), (f), (h), (i), (j), (k), (l), (m), (h), (f) in order, and then is passed through the reading portion for the ② page, and then is passed through the sheet paths (h), (i), (j), (k), (l), (m), (h), (f) in order, and then is passed through the reading portion for the ① page, and then is passed through the sheet paths (h), (i), (j) to return the tray 521.

(D-7) The above-mentioned processes (D-5), (D-6) are repeated by a predetermined number of times in accordance with the processing mode determined by the partition paper 400B.

(D-8) As similar to the above-mentioned process (C-13), the original group $D_2$ is ejected onto the partition paper 400A for the original group $D_1$ stacked in the tray 530 in the same order as in the tray 51 (Also in this case, as mentioned in the above (C-13), in the last circulating cycle, the originals may be ejected into the tray 530 after the reading operation of the respective originals has been completed). In this way, the processing of the original group $D_2$ is completed.

After the processing of all of the original groups $D_1$, $D_2$ has been completed, the second sensor S2 detects the fact that there is no original in the tray 51, thus completing the processing operation.

The originals after processed are received in the ejector tray 530, and since the stacked order of the originals in the tray 530 is the same as the stacked order of the originals when they have been set, the re-arranging operation for the pages of the originals can be omitted. Further, since the partition paper exists between the original groups $D_1$ and $D_2$, any original group can be easily separated from the other original groups. In addition, as to the copied papers, since they are ejected in the order same as the order of the set originals, a further treatment of the copied sheets can be very convenient.

In the illustrated embodiments, while the sheet path (c) for acting as the ejector path (FIGS. 3 and 6) was included in the original reserving portion A, it may be included in the original circulating portion B.

As mentioned above, the size of the original can cause a problem to occur when the original is fed from the A portion to the B portion.

In general, the original tray is provided with lateral regulating members for defining side edges of the original feeding path, thereby restraining the lateral or transverse movement of the original to a minimum. In this condition, for example, the originals having B5 size are fed and processed in the B portion. On the other hand, it is assumed that the originals having A4 size are set in the A portion. In this case, when the original from the A portion is fed to the original tray of the B portion, since the movement of the original is obstructed by the lateral regulating members, the jamming of the original will occur. To the contrary, if the originals having A4 size are set in the original tray of the B portion and the originals having B5 size are set in the original tray of the A portion, the movement of the original is not obstructed by the lateral regulating guides, thus preventing the jamming of the original, but there will arise a problem that the lateral regulating guides cannot prevent the lateral movement of the original, thus not ensuring the lateral registration of the original. In this connection, only when the width of the original tray of the A portion is the same as that of the original tray of the B portion, the feeding of the original from the A portion to the B portion is permitted.

Figure 8A:
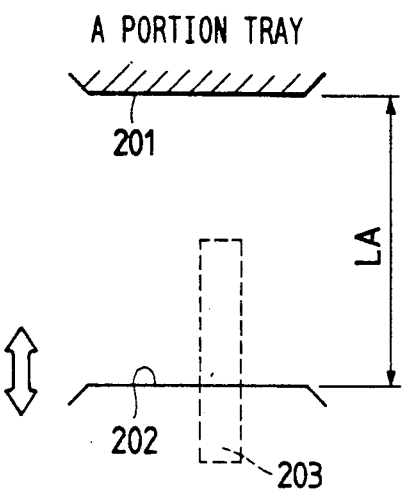
FIGS. 8A and 8B are schematic views showing trays in A and B portions, respectively.
Figure 8B:
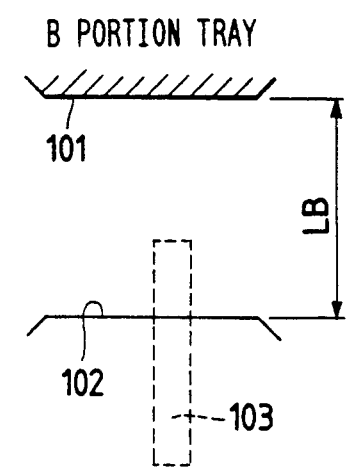
Figure 8C:
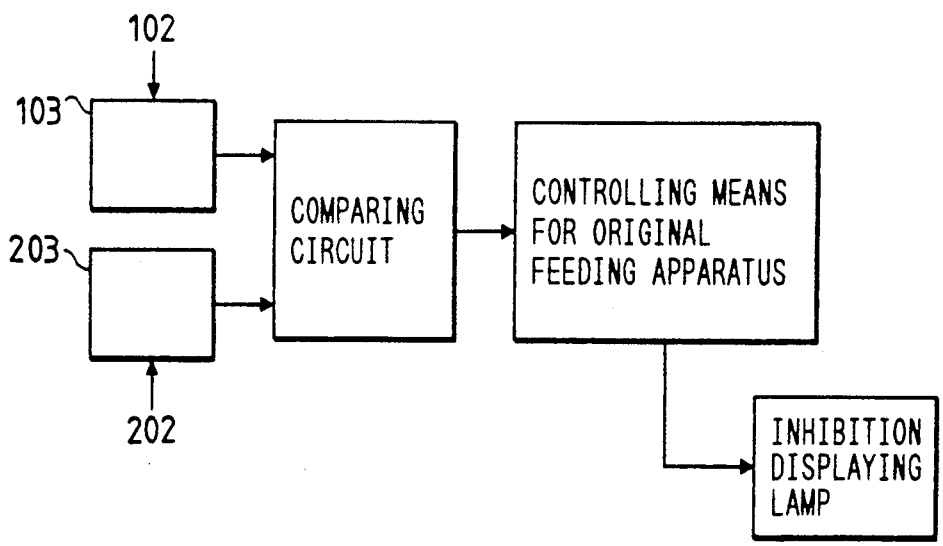
FIG. 8C is a block diagram of a device for controlling embodiment of FIGS. 8A and 8B.

Such a relation is shown in FIG. 8. As shown in FIG. 8A, a movable guide 202 is mounted for movement toward and away from a fixed guide 201 of the A portion, and a position detecting member 203 is fixedly attached to the movable guide 202. The position detecting member 203 detects a width LA between the guides. As shown in FIG. 8B, similarly, the B portion has a movable guide 102 mounted for movement toward and away from a fixed guide 101, and a position detecting member 103 fixedly attached to the movable guide 102 and serving to detect a width LB between the guides. By comparing the width LA with the width LB, it is possible to judge whether the feeding of the original is permitted or inhibited (Comprising Circuit and Controlling Circuit in FIG. 8C).

Figure 9A:
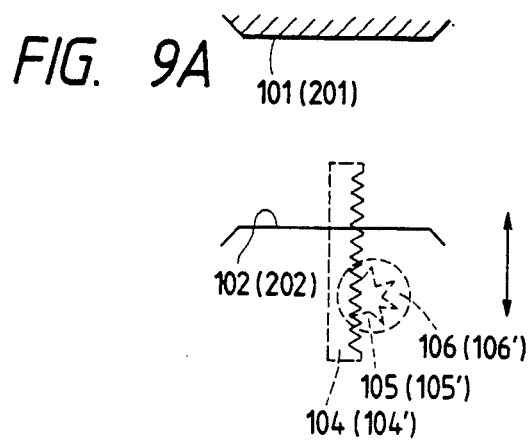
FIG. 9A is a schematic view of a mechanism for driving the trays.

Alternatively, by designing the device such that not only the movable guide 102 can be shifted manually, but also, as shown in FIG. 9, the movable guide 102 can be driven in the lateral direction by means of a rack 104 fixedly attached to the movable guide and meshed with a pinion gear 105 fixed to a motor shaft of a motor (synchronous motor) 106, it is possible to control the tray width LB of the B portion to have the same value as that of the tray width LA of the A portion wherever to movable guide 102 defining the tray width LB be situated. Alternatively, it may be so designed that the motor 16 is rotated when the movable guide 102 is manually adjusted and the rotation of the motor 106 is transmitted to a motor 106' for the guide 202 by the same amount.

Figure 9B:
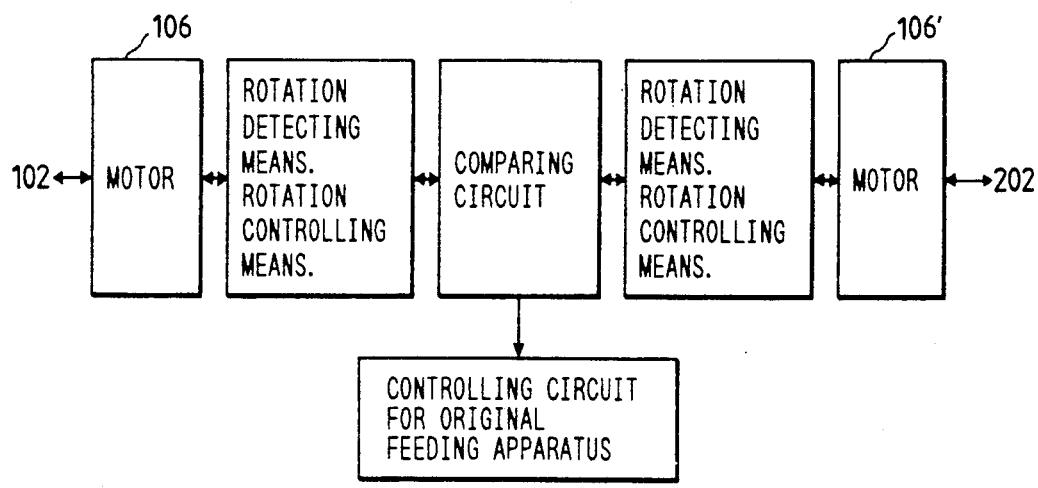
FIG. 9B is a block diagram for controlling embodiment of FIG. 9A.

The details of this are explained with reference to FIG. 9B. For example, if the guide is shifted the motor 106 rotates to be detected by rotation detecting means. Consequently, the motor 106' is rotated by rotation controlling means through the comparing circuit and is stopped at the time when the guides 102 and 202 are shifted by the same amount. The controlling circuit for original supplying apparatus having received the signal showing the guides 102 and 202 corresponded allows supply of the originals.

With the arrangement mentioned above, since the widths between the guides can be optionally controlled, when the original group is fed from the A portion to the B portion, it may be so designed that the originals are put in order and stacked onto the tray by slightly widening the width between the guides of the tray more than a predetermined value in consideration of the skew-feed and of the lateral movement of the original during a long distant feeding of the original and by applying the jogging to each original. Of course, when the widths between the guides of the A portion is equal to that of the B portion, for example, even if the originals having A3 size are set in the A portion and the originals having A4 size are set in the B portion, the original can be fed from the A portion to the B portion without problem. Further, there is no need for regulating the lateral dimension of the portion 30 (FIG. 3) defining the ejector tray, which can freely receive the originals regardless of the size of the originals set in the original trays of the A and B portions.

Next, the manner in which ejection occurs when the original groups are set in the A and B portions will be explained.

Figure 10A:
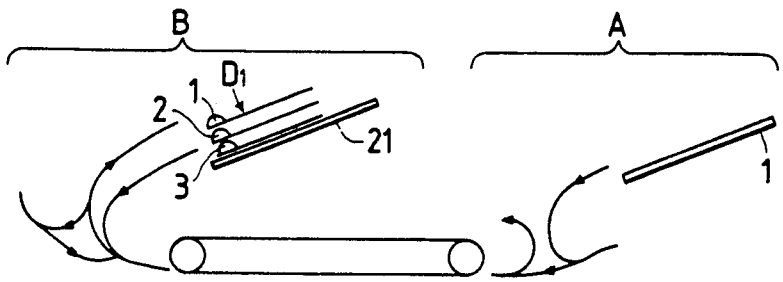
FIGS. 10A to 10E, 11A to 11E and 12A to 12C views showing original treating fashions and flows of the originals in A and B portions.
Figure 10B:
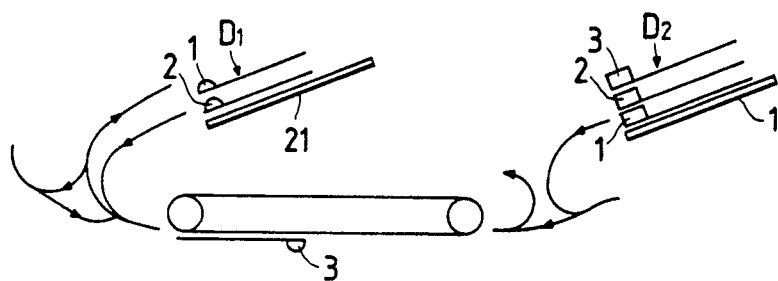
Figure 10C:
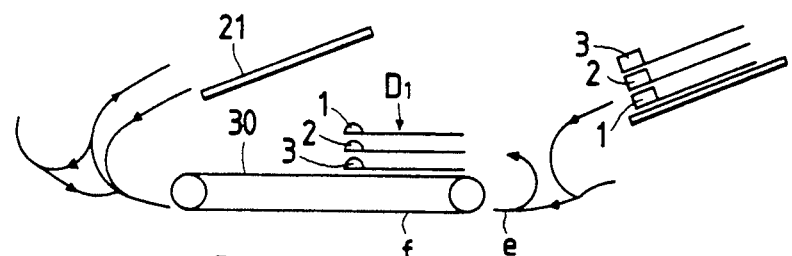

Now, it is assumed that the original group $D_2$ is set in the A portion (FIG. 10B) while the original group $D_1$ set in the B portion and having the different size is being processed (FIG. 10A). In this case, in the last original circulating cycle, the processed originals are ejected onto the ejector tray 30 and the tray 21 is cleared to receive the originals from the A portion (FIG. 10C).

Figure 11A:
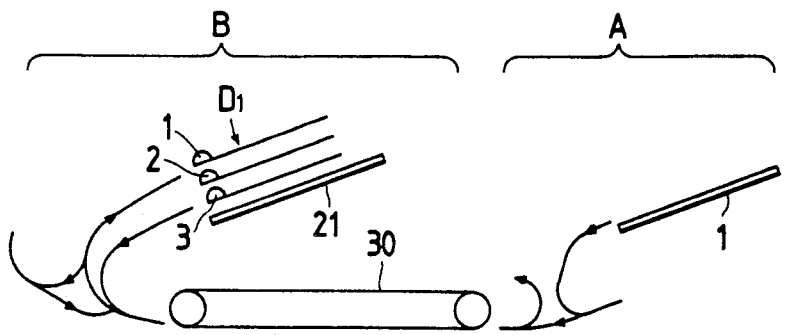
Figure 11B:
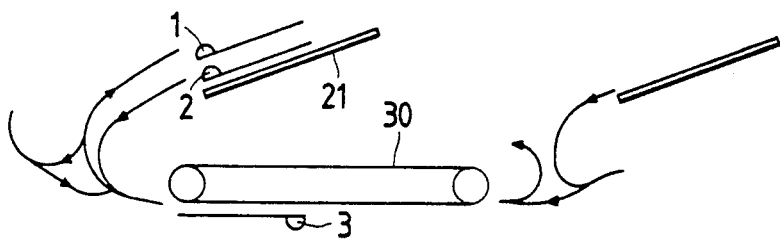
Figure 11C:
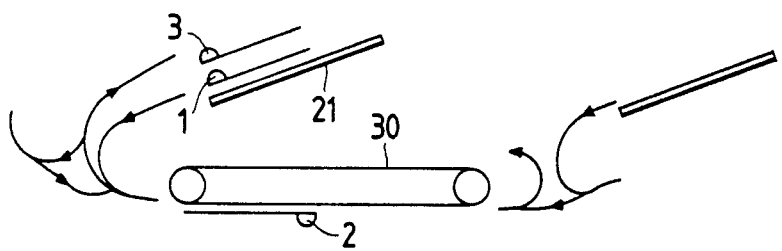

If the originals are not set in the A portion while the originals are processed in the B portion, there is no need for ejecting the processed originals onto the tray 30 in the last original circulating cycle, and the processed originals may be ejected onto the tray 21 (FIGS. 11A, 11B and 11C).

Figure 11D:
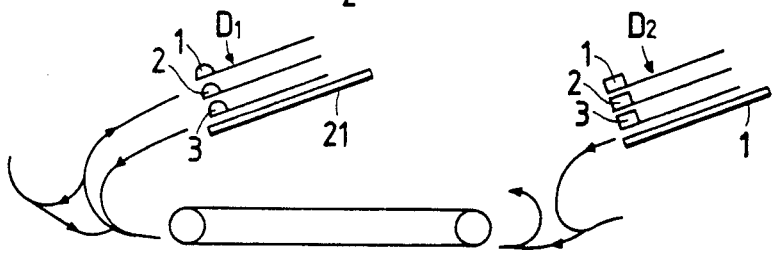
Figure 11E:
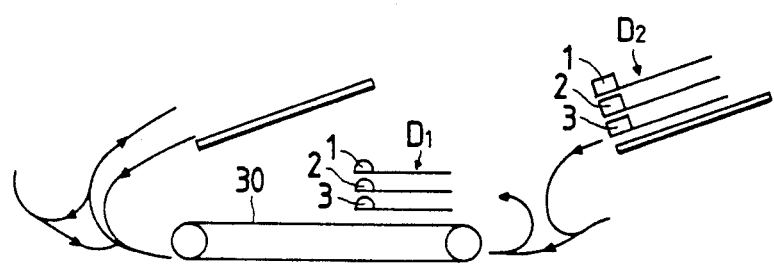

If the originals are set the A portion in when the processing of the originals in the B portion has been completed (FIG. 11D), as mentioned above, the processed originals may be ejected onto the tray 30 to clear the original from the B portion (FIG. 11E).

Figure 10D:
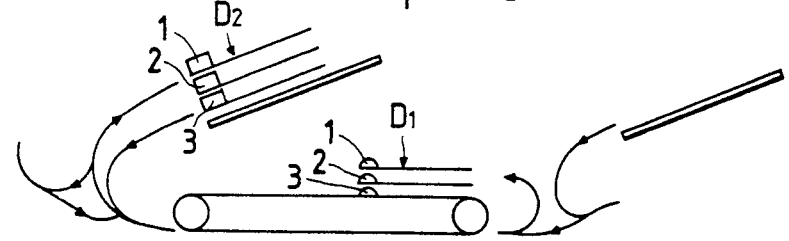

In FIG. 10D, after the originals have been fed from the A portion to the tray of the B portion and such originals have been processed, such originals may be ejected onto the tray of the B portion or onto the tray 30. In this case, in order to distinguish the original group from the former original group, the device may be so designed that each original group is offset ejected to permit the discrimination of the respective original group.

Figure 10E:
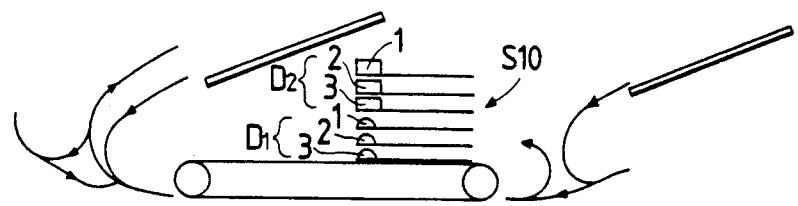
Figure 12A:
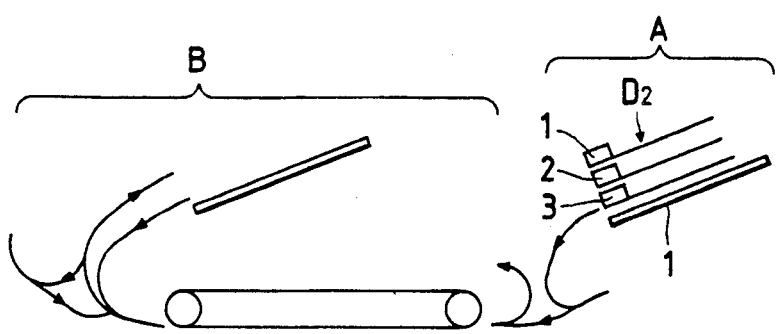
Figure 12B:
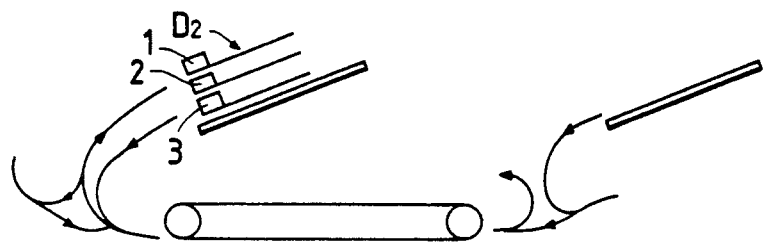
Figure 12C:
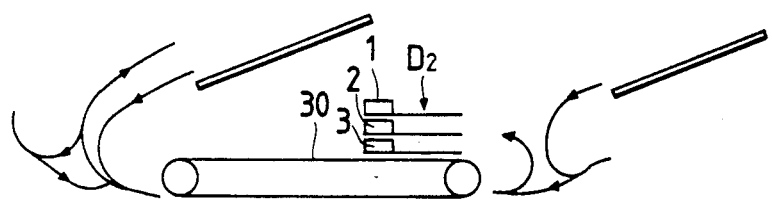
Figure 13:
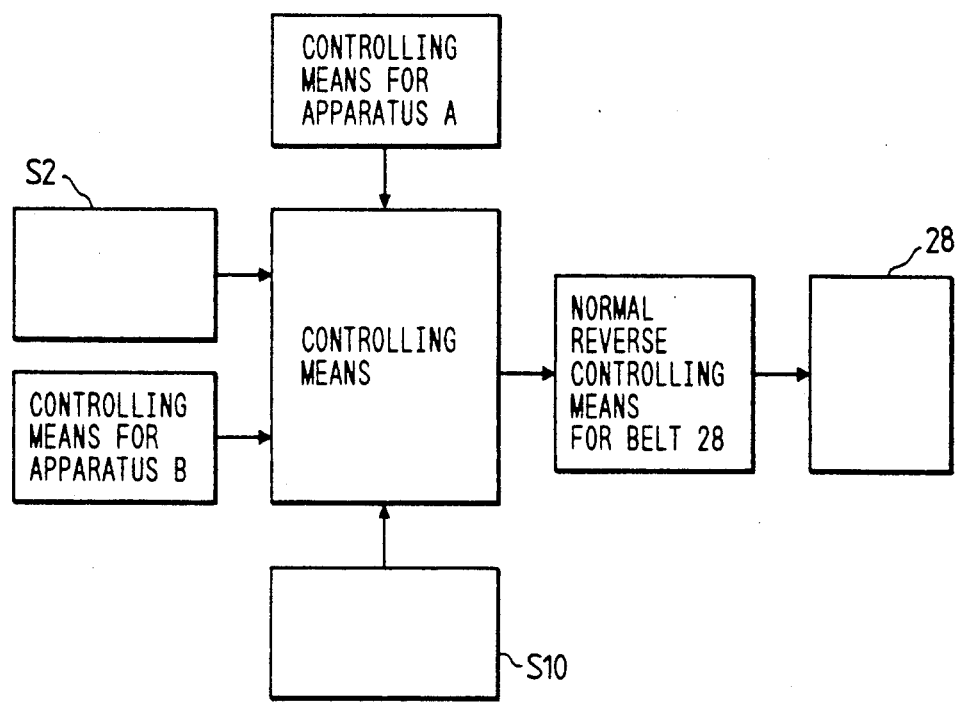
FIG. 13 is a block diagram of a device for controlling the embodiment of FIGS. 10 to 12.

In FIG. 12A, after the originals set in the tray of the A portion have been fed to the tray of the B portion and such originals have been processed, such originals may be returned to the tray of the B portion or may be ejected onto the tray 30, as shown in FIG. 12C. Further, as shown in FIG. 10E, it is feared that when the tray 30 is filled with the ejected originals the entrance is blocked by the ejected originals, thus causing the jamming of the original in the ejector portion. To avoid this, a means $S_{20}$ for detecting the height of the ejected originals may be provided to permit a judgement as to whether the feeding of the original from the tray of the B portion is permitted or inhibited on the basis of a signal from such detecting means. Alternatively, a counter means for counting the number of the ejected originals may be provided so that the feeding of the original is stopped when the counted value exceeds a predetermined value.

Figure 2:
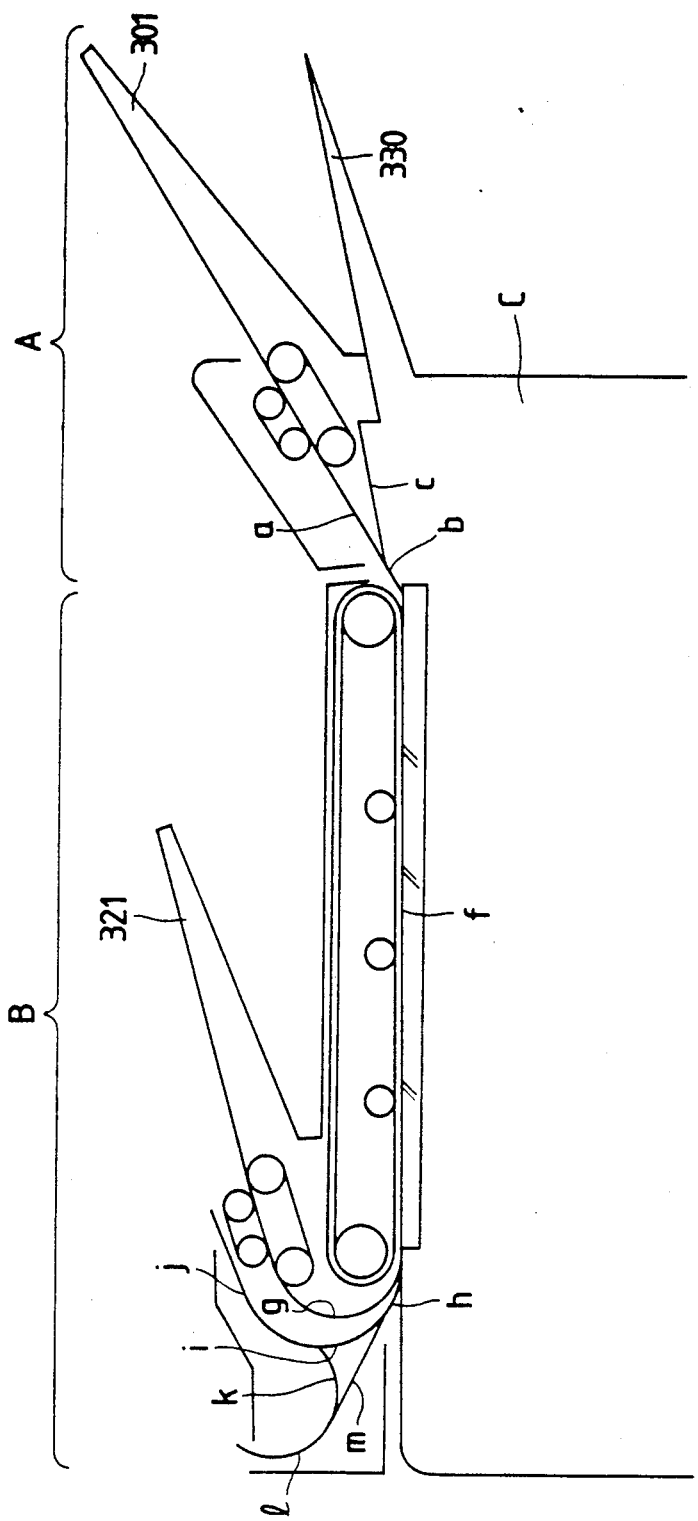

Incidentally, if the compactness of the apparatus is not needed, while the ejector tray 30 was constituted by the upper surface of the B portion in the illustrated embodiment, an ejector tray may be arranged in a position as shown in FIG. 1 or 2 (the position where the ejector tray 230 or 330 is arranged).

What is claimed is:

1. A reserving type original feeding apparatus comprising:
   a first original feeding portion having (a) a first stack tray on which originals are supported, said first stack tray being adapted to receive manually-set originals, (b) first separating/supplying means for separating and supplying the originals supported in said first stack tray one by one, and (c) a first sheet path for introducing the original supplied by said first separating/supplying means to a processing portion and for ejecting the original processed by the processing portion from the processing portion;
   a reserving original feeding portion having (d) a second stack tray on which originals are supported, said second stack tray being adapted to receive manually-set originals, (e) second separating/supplying means for separating and supplying the originals supported in said second stack tray one by one, and (f) a second sheet path for introducing the original supplied by said second separating/supplying means to the first original feeding portion;
   an original ejection tray; and
   an ejection sheet path for ejecting the original processed by the processing portion to said original ejector tray from said processing portion, wherein on each of said first and second stack trays, the originals are set simultaneously to process the originals on said first stack tray and thereafter to process the originals on said second stack tray by feeding them to the first original feeding portion.

2. A reserving type original feeding apparatus according to claim 1, wherein said circulating original feeding portion and said reserving original feeding portion are arranged on either side of said processing portion, respectively, with said processing portion interposed therebetween.

3. A reserving type original feeding apparatus according to claim 2, wherein said processing portion comprises a reading portion having a glass platen.

4. A reserving type original feeding apparatus according to claim 3, wherein said reading portion ejects the original and wherein said second ejection sheet path is curved upwardly to turn over the original ejected from said reading portion.

5. A reserving type original feeding apparatus according to claim 4, wherein said second ejection sheet path is arranged at an end of said platen near said reserving original feeding portion.

6. A reserving type original feeding apparatus according to claim 5, wherein said second ejection sheet path is branched from said second introduction sheet path in a switch back direction.

7. A reserving type original feeding apparatus comprising:

a circulating original feeding portion having (a) a first stack tray on which originals are supported, (b) first separation/supplying means for separating and supplying the originals supported in said first stack tray one by one from the bottom, (c) a first introduction sheet path for introducing the original supplied by said first separating/supplying means to a processing portion, and (d) a first ejection sheet path for ejecting the original processed by the processing portion to said first stack tray from the processing portion;

a reserving original feeding portion having (e) a second stack tray on which originals are supported, (f) second separating/supplying means for separating and supplying the originals supported in said second stack tray one by one, and (g) a second introduction sheet path for introducing the original supplied by said second separating/supplying means to the processing portion;

an original ejector tray for receiving the original processed by the processing portion;

a second ejection sheet path for ejecting the original processed by the processing portion to said original ejector tray from the processing portion; and wherein, when no originals whose processing sequence is reversed are supported on said second stack tray, a first original group on said first stack tray is ejected onto said first stack tray or onto said ejector tray after said first original group has been processed, and, when originals comprising a second original group are supported on said stack tray, said first original group on said first stack tray is ejected onto said ejector tray after said first original group has been processed.

8. A reserving type original feeding apparatus according to claim 7, wherein after said first original group has been ejected onto said ejector tray, said second original group is fed to said circulating original feeding portion, and thereafter, said second original group is ejected onto said first stack tray after said second original group has been processed.

9. A reserving type original feeding apparatus according to claim 7, wherein after said first original group has been ejected onto said ejector tray, said second original group is fed to said circulating original feeding portion, and thereafter, said second original group is ejected onto said first stack tray or onto said ejector tray after said second original group has been processed.

10. A reserving type original feeding apparatus according to claim 9, wherein said ejector tray includes means for detecting whether said ejector tray is filled with originals.

11. A reserving type original feeding apparatus comprising:

a circulating original feeding portion having (a) a first stack tray on which originals are supported, (b) first separation/supplying means for separating and supplying the originals supported in said first stack tray one by one from the bottom, (c) a first introduction sheet path for introducing the original supplied by said first separating/supplying means to a processing portion, and (d) a first ejection sheet path for ejecting the original processed by the processing portion to said first stack tray from the processing portion, (e) a first regulating guide for regulating the lateral movement of the original on said first stack tray in a direction transverse to an original feeding direction, and (f) first position detecting means for detecting a position of said first regulating guide;

a reserving original feeding portion having (g) a second stack tray on which originals are supported, (h) second separating/supplying means for separating and supplying the originals supported in said second stack tray one by one from the bottom, (i) a second introduction sheet path for introducing the original supplied by said second separating/supplying means to the processing portion, (j) a second regulating guide for regulating the lateral movement of the original on said second stack tray in a direction transverse to the original feeding direction, and (k) second position detecting means for detecting a position of said second regulating guide;

an original ejector tray for receiving the original processed by the processing portion;

a second ejection sheet path for ejecting the original processed by the processing portion to said original ejector tray from the processing portion; and, wherein the width of said first regulating guide detected by said first position detecting means is compared with the width of said second regulating guide detected by said second position detecting means, and, when the widths are equal to each other, the feeding of the original from said reserving original feeding portion to said circulating original feeding portion is permitted.

12. A reserving type original feeding apparatus comprising:

a circulating original feeding portion having (a) a first stack tray on which originals are supported, (b) first separation/supplying means for separating and supplying the originals supported in said first stack tray one by one from the bottom, (c) a first introduction sheet path for introducing the original supplied by said first separating/supplying means to a processing portion, and (d) a first ejection sheet path for ejecting the original processed by the processing portion to said first stack tray from the processing portion, and (e) a first regulating guide for regulating the lateral movement of the original on said first stack tray in a direction transverse to an original feeding direction;

a reserving original feeding portion having (f) a second stack tray on which originals are supported, (g) second separating/supplying means for separating and supplying the originals supported in said second stack tray one by one from the bottom, (h) a second introduction sheet path for introducing the original supplied by said second separating/supplying means to the processing portion, and (i) a second regulating guide for regulating the lateral movement of the original on said second stack tray in a direction transverse to the original feeding direction;

an original ejector tray for receiving the original processed by the processing portion;

a second ejection sheet path for ejecting the original processed by the processing portion to said original ejector tray from the processing portion; and driving means for driving said first and second regulating guides to change the widths thereof, wherein said first regulating guide and said second regulating guide are driven by said driving means to have the same lateral widths.

13. A reserving type original feeding apparatus according to claim 12, wherein said driving means comprises a motor for shifting each of said first and second regulating guides.

14. A reserving type original feeding apparatus according to claim 13, wherein said first and second regulating guides are positioned by controlling said driving means.

15. A reserving type original feeding apparatus according to claim 13, wherein an amount of movement of one of said regulating guides is transmitted to the other regulating guide through said motor.

16. An image forming apparatus comprising:
a first original feeding portion having (a) a first stack tray on which originals are supported, said first stack tray being adapted to receive manually-set originals, (b) first separating/supplying means for separating and supplying the originals supported in said first stack tray one by one, (c) a first sheet path for introducing the original supplied by said first separating/supplying means to a processing portion and for ejecting the original processed by the processing portion from the processing portion;

a reserving original feeding portion having (d) a second stack tray on which originals are supported, said second stack tray being adapted to receive manually-set originals, (e) second separating/supplying means for separating and supplying the originals supported in said second stack tray one by one, and (f) a second sheet path for introducing the original supplied by said second separating/supplying means to the first original feeding portion;

an original ejector tray;

a second ejection sheet path for ejecting the original processed by the processing portion to said original ejector tray from the processing portion;

an image forming portion for forming an image corresponding to an image recorded on the original; and feeding means for feeding a sheet material to said image forming portion, wherein on each of said first and second stack trays, the originals are set simultaneously to process the originals on said first stack tray and thereafter to process the originals on said second stack tray by feeding them to the original feeding portion.

17. An image forming system comprising:
a circulating type original feeding portion having (a) a first stack tray on which originals are supported, (b) first separating/supplying means for separating and supplying the originals supported in said first stack tray one by one from the bottom, (c) a first introduction sheet path for introducing the original supplied by said first separating/supplying means to a processing portion, and (d) a first ejection sheet path for ejecting the original processed by the processing portion to said first supply tray from the processing portion;

a reserving original feeding portion having (e) a second stack tray on which originals are supported, (f) second separating/supplying means for separating and supplying the originals supported in said second stack tray one by one from the bottom, and (g) a second introduction sheet path for introducing the original supplied by said second separating/supplying means to the processing portion;

an original ejector tray for receiving the original processed by the processing portion;

a second ejection sheet path for ejecting the original processed by the processing portion to said original ejector tray from the processing portion;

an image forming portion for forming an image corresponding to an image recorded on the original; and feeding means for feeding a sheet material to said image forming portion; and wherein, when no originals whose processing sequence is reserved are supported on said second supply tray, a first original group on said first stack tray is ejected onto said first stack tray or onto said ejector tray after said first original group has been processed, and when originals comprising a second original group are supported on said second stack tray, said first original group on said first stack tray is ejected onto said ejector tray after said first original group has been processed.

18. An image forming system comprising:
a circulating type original feeding portion having (a) a first stack tray on which originals are supported, (b) first separating/supplying means for separating and supplying the originals supported in said first stack tray one by one from the bottom, (c) a first introduction sheet path for introducing the original supplied by said first separating/supplying means to a processing portion, (d) a first ejection sheet path for ejecting the original processed by the processing portion to said first stack tray from the processing portion, (e) a first regulating guide for regulating the lateral movement of the original on said first stack tray in a direction transverse to an original feeding direction, and (f) first position detecting means for detecting a position of said first regulating guide;

a reserving original feeding portion having (g) a second stack tray on which originals are supported, (h) second separating/supplying means for separating and supplying the originals supported in said second stack tray one by one from the bottom, (i) a second introduction sheet path for introducing the original supplied by said second separating/supplying means to the processing portion, (j) a second regulating guide for regulating the lateral movement of the original on said second stack tray in a direction transverse to the original feeding direction, and (k) second position detecting means for detecting a position of said second regulating guide;

an original ejector tray for receiving the original processed by the processing portion;

a second ejection sheet path for ejecting the original processed by the processing portion to said original ejector tray from the processing portion;

an image forming portion for forming an image corresponding to an image recorded on the original; and feeding means for feeding a sheet material to said image forming portion; and, wherein the width of said first regulating guide detected by said first position detecting means is compared with the width of said second regulating guide detected by said second position detecting means, and, when said widths are equal to each other, the feeding of the original from said reserving original feeding portion to said circulating original feeding portion is permitted.

19. An image forming system comprising:

a circulating type original feeding portion having (a) a first stack tray on which originals are supported, (b) first separating/supplying means for separating and supplying the originals supported in said first stack tray one by one from the bottom, (c) a first introduction sheet path for introducing the original supplied by said first separating/supplying means to a processing portion, (d) a first ejection sheet path for ejecting the original processed by the processing portion to a first stack tray from the processing portion, (e) a first regulating guide for regulating the lateral movement of the original on said first stack tray in a direction transverse to an original feeding direction;

a reserving original feeding portion having (f) a second stack tray on which originals are supported, (g) a second separating/supplying means for separating and supplying the originals supported in said second stack tray one by one from the bottom, (h) a second introduction sheet path for introducing the original supplied by said second separating/supplying means to the processing portion, and (i) a second regulating guide for regulating the lateral movement of the original on said second stack tray in a direction transverse to the original feeding direction;

an original ejector tray for receiving the original processed by the processing portion;

a second ejection sheet path for ejecting the original processed by the processing portion to said original ejector tray from the processing portion;

an image forming portion for forming an image corresponding to an image recorded on the original;

feeding means for feeding a sheet material to said image forming portion; and driving means for driving said first and second regulating guides to change the lateral widths thereof, wherein said first regulating guide and said second regulating guide are driven by said driving means to have the same lateral widths.

20. A reserving type original feeding apparatus comprising:

a circulating type original feeding portion having (a) a first stack tray on which originals are supported, (b) first separating/supplying means for separating and supplying the originals supported in said first stack tray one by one from the bottom, (c) a processing portion, (d) a first introduction sheet path for introducing the original supplied by said first separating/supplying means to said processing portion, and (e) a first ejection sheet path for ejecting the original processed by said processing portion to said first supply tray from the processing portion;

a reserving original feeding portion having (f) a second stack tray on which originals are supported, (g) a second separating/supplying means for separating and supplying the originals supported in said second stack tray one by one from the bottom, and (h) a second introduction sheet path for introducing the original supplied by said second separating/supplying means to said circulating original feeding portion;

an original ejector tray arranged substantially directly above said processing portion; and a second ejection sheet path for ejecting the original processed by said processing portion to said original ejector tray from said processing portion.

21. A reserving type original feeding apparatus according to claim 20, wherein said circulating original feeding portion and said reserving original feeding portion are arranged on either side of said processing portion, respectively, with said processing portion interposed therebetween.

22. A reserving type original feeding apparatus according to claim 21, wherein said processing portion comprises a reading portion having a glass platen.

23. A reserving type original feeding apparatus according to claim 22, wherein said reading portion ejects the original, wherein said second ejection sheet path is curved upwardly to turn over the original ejected from said reading portion.

24. A reserving type original feeding apparatus according to claim 23, wherein said second ejection sheet path is arranged at an end of said glass platen near said reserving original feeding portion.

25. A reserving type original feeding apparatus according to claim 24, wherein said second ejection sheet path is branched from said second introduction sheet path in a switch back direction.

26. A reserving type original feeding apparatus comprising:

an original feeding path portion having (a) a first sheet stack tray on which originals are supported, (b) first separating/supplying means for separating and supplying the originals supported in said first stack tray one by one, (c) a processing portion, (d) a first introduction sheet path for introducing the original supplied by said first separating/supplying means to said processing portion, and (e) a first ejection sheet path for ejecting the original processed by said processing portion to said first sheet stack tray from said processing portion;

a reserving original feeding portion having (f) a second stack tray on which originals are supported, (g) second separating/supplying means for separating and supplying the originals supported in said second stack tray one by one, and (h) a second introduction sheet path for introducing the original supplied by said second separating/supplying means to said original feeding portion;

an original ejector tray arranged substantially directly above said processing portion; and a second ejection sheet path for ejecting the original processed by said processing portion to said original ejector tray from said processing portion.

27. A reserving type original feeding apparatus comprising:

a circulating original feeding portion having (a) a first stack tray on which originals are supported, (b) first separating/supplying means for separating and supplying the originals supported in said first stack tray one by one from the bottom, (c) a first introduction sheet path for introducing the original supplied by said first separating/supplying means to a processing portion, and (d) a first ejection sheet path for ejecting the original processed by the processing portion to said first stack tray from the processing portion; and, a reserving original feeding portion having (e) a second stack tray on which originals are supported, (f) second separating/supplying means for separating and supplying the originals supported in said second stack tray one by one, and (g) a second introduction sheet path for introducing the original supplied by said second separating/supplying means to said circulating original feeding portion;

an original ejector tray for receiving the original processed by the processing portion;

a second ejection sheet path for ejecting the original processed by the processing portion to said original ejector tray from the processing portion; and wherein, when no originals whose processing sequence is reserved are supported on said second stack tray, a first original group on said first stack tray is ejected onto said first stack tray or onto said ejector tray after said first original group has been processed, and when originals comprising a second original group whose processing sequence is reserved are supported on said second stack tray, said first original group on said first stack tray is ejected onto said ejector tray after said first original group has been processed.

28. A reserving type original feeding apparatus comprising:

an original feeding portion having (a) a first stack tray on which originals are supported, said first stack tray being adapted to receive manually-set originals, (b) first separating/supplying means for separating and supplying the original supported in said first stack tray one by one, (c) a processing portion, (d) a first introduction sheet path for introducing the original supplied by said first separating/supplying means to said processing portion, and (e) an ejection sheet path for ejecting the original processed by said processing portion to said first stack tray from said processing portion;

a reserving original feeding portion having (f) a second stack tray on which originals are supported, said second stack tray being adapted to receive manually-set originals, (g) second separating/supplying means for separating and supplying the originals supported in said second stack tray one by one, and (h) a second introduction sheet path for introducing the original supplied by said second separating/supplying means to said original feeding portion; and control means for controlling said apparatus so that the original set on said original feeding portion is first supplied to said processing portion for reading, and then an original set on said reserving original feeding portion is automatically supplied to said processing portion for reading through said original feeding portion when the originals on said first stack tray are exhausted.

29. A reserving type original feeding apparatus according to claim 1, wherein said second introduction sheet path of said reserving original feeding portion introduces the original supplied by said second separation/supplying means to said first stack tray.

30. A reserving type original feeding apparatus comprising:

an original feeding portion having (a) a first stack tray on which originals are supported, said first stack tray being adapted to receive manually-set originals, (b) first separating/supplying means for separating and supplying the originals supported in said first stack tray one by one, (c) a processing portion, (d) a first sheet path for introducing the original supplied by said first separating/supplying means to said processing portion and for ejecting the original processed by said processing portion from said processing portion;

a reserving original feeding portion having (e) a second stack tray on which originals are supported, said second stack tray being adapted to receive manually-set originals, (f) second separating/supplying means for separating and supplying the originals supported in said second stack tray one by one, and (g) a second introduction sheet path for introducing the original supplied by said second separating/supplying means to said original feeding portion; and control means for controlling said apparatus so that the original set on said original feeding portion is first supplied to said processing portion for reading and then, an original set on said reserving original feeding portion is automatically supplied to said processing portion for reading through said original feeding portion when the original on said first stack tray is exhausted.

31. A reserving type original feeding apparatus comprising:

an original feeding portion having (a) a first stack tray on which originals are supported, said first stack tray being adapted to receive manually-set originals, (b) first separating/supplying means for separating and supplying the originals supported in said first stack tray one by one, (c) a processing portion, (d) a first sheet path for introducing the original supplied by said first separating/supplying means to said processing portion and for ejecting the original processed by said processing portion from said processing portion;

a reserving original feeding portion having (e) a second stack tray on which originals are supported, said second stack tray being adapted to receive manually-set originals, (f) second separating/supplying means for separating and supplying the originals supported in said second stack tray one by one, and (g) a second introduction sheet path for introducing the original supplied by said second separating/supplying means to said original feeding portion; and control means for controlling said apparatus so that the original set on said original feeding portion is first supplied to said processing portion for reading, and then, an original set on said reserving original feeding portion is automatically supplied to said processing portion for feeding through said original feeding portion, when the original on said first stack tray is exhausted.

32. A reserving type original feeding apparatus comprising:

an original feeding portion having (a) a first stack tray on which originals are supported, (b) first separating/supplying means for separating and supplying the originals supported in said first stack tray one by one from the bottom, (c) a first sheet path for introducing the original supplied by said first separating/supplying means to a processing portion, and for ejecting the original processed by the processing portion from the processing portion, (d) a first regulating guide for regulating the lateral movement of the original on said first stack tray in a direction transverse to an original feeding direction, and (e) first position detecting means for detecting a position of said first regulating guide;

a reserving original feeding portion having (f) a second stack tray on which originals are supported, (g) second separating/supplying means for separating and supplying the originals supported in said second stack tray one by one from the bottom, (h) a second introduction sheet path for introducing the original supplied by said second separating/supplying means to said original feeding portion, (i) a second regulating guide for regulating the lateral movement of the original on said second stack tray in a direction transverse to the original feeding direction, and (j) second position detecting means for detecting a position of said second regulating guide;

wherein the width LB of said first regulating guide detected by said first position detecting means is compared with the width LA of said second regulating guide detected by said second position detecting means, and, when said widths are equal to each other, the feeding of the original from said reserving original feeding portion to said original feeding portion is permitted.

33. A reserving type original feeding apparatus comprising:

an original feeding portion having (a) a first stack tray on which originals are supported, (b) first separating/supplying means for separating and supplying the originals supported in said first stack tray one by one from the bottom, (c) a first sheet path for introducing the original supplied by said first separating/supplying means to a processing portion, and for ejecting the original processed by the processing portion from the processing portion, and (d) a first regulating guide for regulating the lateral movement of the original on said first supply tray in a direction transverse to an original feeding direction;

a reserving original feeding portion having (e) a second stack tray on which originals are supported, (f) second separating/supplying means for separating and supplying the originals supported in said second stack tray one by one from the bottom, (g) a second introduction sheet path for introducing the original supplied by said second separating/supplying means to the original feeding portion, and (h) a second regulating guide for regulating the lateral movement of the original on said second stack tray in a direction transverse to the original feeding direction; and driving means for driving said first and second regulating guides to change the widths thereof, wherein said first regulating guide and said second regulating guide are driven by said driving means to have the same lateral widths.

34. A reserving type original feeding apparatus, comprising:

an original feeding portion having (a) a first stack tray on which originals are supported, (b) first separating/supplying means for separating and supplying the originals supported in the first stack tray one by one, (c) a first sheet path for introducing the original supplied by said first separating/supplying means to a processing portion and ejecting the original processed by the processing portion from the processing portion, (d) a first regulating guide for regulating the lateral movement of the original on said first stack tray in a direction transverse to an original feeding direction, and (e) first position detecting means for detecting a position of said first regulating guide; and a reserving original feeding portion having (f) a second stack tray on which originals are supported, (g) second separating/supplying means for separating and supplying the originals supported in said second stack tray one by one, (h) a second introduction sheet path for introducing the original supplied by said second separating/supplying means to the original feeding portion; (i) a second regulating guide for regulating the lateral movement of the original on said second stack tray in a direction transverse to the original feeding direction, and (j) second position detecting means for detecting a position of said second regulating guide;

wherein the width formed by said first regulating guide detected by said first position detecting means is compared with the width formed by said second regulating guide detected by said second position detecting means, and when, said widths are equal to each other, the feeding of the original from said reserving original feeding portion to said original feeding portion is permitted.

35. A reserving type original feeding apparatus, comprising:

an original feeding portion having (a) a first stack tray on which originals are supported, (b) first separating/supplying means for separating and supplying the originals supported in the first stack tray one by one, (c) a first sheet path for introducing the original supplied by said first separating/supplying means to a processing portion and for ejecting the original processed by the processing portion from the processing portion, and (d) a first regulating guide for regulating the lateral movement of the original on said first supply tray in a direction transverse to an original feeding direction;

a reserving original feeding portion having (e) a second stack tray on which originals are supported, (f) second separating/supplying means for separating and supplying the originals supported in said second stack tray one by one, (g) a second introduction sheet path for introducing the original supplied by said second separating/supplying means to the original feeding portion, and (h) a second regulating guide for regulating the lateral movement of the original on said second stack tray in a direction transverse to the original feeding direction; and driving means for driving said first and second regulating guides to change the lateral positions thereof, wherein said first regulating guide and said second regulating guide are driven by said driving means to form the same lateral widths.

36. An image forming apparatus, comprising:

an original feeding portion having (a) a first sheet stack tray on which originals are supported, (b) a first separating/supplying means for separating and supplying the originals supported in the first stack tray one by one, (c) a processing portion, (d) a first introduction sheet path for introducing the original supplied by said first separating/supplying means to said processing portion, and (e) a first ejection sheet path for ejecting the original processed by said processing portion to said first sheet stack tray from said processing portion;

a reserving original feeding portion having (f) a second stack tray on which the originals are supported, (g) second separating/supplying means for separating and supplying the originals supported in said second stack tray one by one, and (h) a second introduction sheet path for introducing the original supplied by said second separating/supplying means to the original feeding portion;

an original ejector tray arranged substantially directly above said processing portion;

a second ejection sheet path for ejecting the original processed by said processing portion to said original ejector tray from said processing portion;

an image forming portion for forming an image corresponding to an image recorded on the original; and feeding means for feeding a sheet material to said image forming portion.

37. An image forming apparatus, comprising:

an original feeding portion having (a) a first stack tray on which originals are supported, said first stack tray being adapted to receive manually-set originals, (b) first separating/supplying means for separating and supplying the originals supported in the first stack tray one by one, (c) a processing portion, and (d) a first sheet path for introducing the original supplied by said first separating/supplying means to said processing portion and for ejecting the original processed by said processing portion from said processing portion;

a reserving original feeding portion having (e) a second stack tray on which the originals are supported, said second stack tray being adapted to receive manually-set originals (f) second separating/supplying means for separating and supplying the originals supported in said second stack tray one by one, and (g) a second introduction sheet path for introducing the original supplied by said second separating/supplying means to said original feeding portion;

an image forming portion for forming an image corresponding to an image recorded on the original;

feeding means for feeding a sheet material to said image forming portion; and control means for controlling said apparatus so that the original set on said original feeding portion is first supplied to said processing portion for reading, and then an original set on said reserving original feeding portion is automatically supplied to said processing portion for reading through said original feeding portion when the originals on said first stack tray are exhausted.

38. An image forming apparatus, comprising:

an original feeding portion having (a) a first stack tray on which originals are supported, (b) first separating/supplying means for separating and supplying the originals supported in the first stack tray one by one, (c) a first sheet path for introducing the original supplied by said first separating/supplying means to a processing portion and for ejecting the original processed by the processing portion from the processing portion, (d) a first regulating guide for regulating the lateral movement of the original on said first stack tray in a direction transverse to an original feeding direction, and (e) first position detecting means for detecting a position of said first regulating guide;

a reserving original feeding portion having (f) a second stack tray on which the originals are supported, (g) a second separating/supplying means for separating and supplying the originals supported in said second stack tray one by one, (h) a second introduction sheet path for introducing the original supplied by said second separating/supplying means to the original feeding portion; (i) a second regulating guide for regulating the lateral movement of the original on said second stack tray in a direction transverse to the original feeding direction, and (j) second position detecting means for detecting a position of said second regulating guide;

an image forming portion for forming an image corresponding to an image recorded on the original; and feeding means for feeding a sheet material to said image forming portion, wherein the width formed by said first regulating guide and detected by said first position detecting means is compared with the width formed by said second regulating guide and detected by said second position detecting means, and when, said widths are equal to each other, the feeding of the original from said reserving original feeding portion to said original feeding portion is permitted.

39. An image forming apparatus, comprising:

an original feeding portion having (a) a first stack tray on which originals are supported, (b) first separating/supplying means for separating and supplying the originals supported in the first stack tray one by one, (c) a first sheet path for introducing the original supplied by said first separating/supplying means to a processing portion and for ejecting the original processed by the processing portion from the processing portion, and (d) a first regulating guide for regulating the lateral movement of the original on said first supply tray in a direction transverse to an original feeding direction;

a reserving original feeding portion having (e) a second stack tray on which the originals are supported, (f) second separating/supplying means for separating and supplying the originals supported in said second stack tray one by one, (g) a second introduction sheet path for introducing the original supplied by said second separating/supplying means to the original feeding portion, and (h) a second regulating guide for regulating the lateral movement of the original on said second stack tray in a direction transverse to the original feeding direction;

an image forming portion for forming an image corresponding to an image recorded on the original;

feeding means for feeding a sheet material to said image forming portion; and driving means for driving said first and second regulating guides to change the tray widths thereof, wherein said first regulating guide and said second regulating guide are driven by said driving means to having the same lateral tray widths.

40. A reserving type original feeding apparatus according to claim 1 or 30, further comprising switchback means for reversing a conveying direction of the original discharged from said processing portion and for returning it to said processing portion; and wherein a curved path and said switchback means introduce the original fed by said second separating/supplying means to said processing portion.

41. A reserving type original feeding apparatus according to claim 1 or 30, further comprising a loop path for reversing a conveying direction of the original discharged from said processing portion and for returning it to said processing portion; and a curved path and switchback means for introducing the original fed by said second separating/supplying means to said processing portion.

42. A reserving type original feeding apparatus according to claim 1 or 30, further comprising switchback means for reversing a conveying direction of the original discharged from said processing portion and for returning it to said processing portion again; and a straight sheet path for introducing the original fed by said second separating/supplying means to said processing means.

43. A reserving type original feeding apparatus according to claim 1 or 30, further comprising a loop path for reversing a conveying direction of the original discharged from said processing portion and for returning it to said processing portion again; and a straight sheet path for introducing the original fed by said second separating/supplying means to said processing means.

* * * * *

UNITED STATES PATENT AND TRADEMARK OFFICE
CERTIFICATE OF CORRECTION

PATENT NO.  : 5,273,266
DATED       : December 28, 1993
INVENTOR(S) : MAKOTO KITAHARA, ET AL.

It is certified that error appears in the above-identified patent and that said Letters Patent is hereby corrected as shown below:

item  [57] ABSTRACT
   Line 4, "means" should be deleted.

Column 1
   Line 5, "continuation-in-part" should read
       --continuation--.

Column 4
   Line 58, "views" should read --are views--.

Column 6
   Line 2, "extend" should read --extends--;
   Line 8, "are" should be deleted;
   Line 35, "in" should be deleted.

Column 7
   Line 6, "an" should read --a--.

Column 9
   Line 3, "turn over" should read --turn-over--.

UNITED STATES PATENT AND TRADEMARK OFFICE
CERTIFICATE OF CORRECTION

PATENT NO. : 5,273,266
DATED : December 28, 1993
INVENTOR(S) : MAKOTO KITAHARA, ET AL.

It is certified that error appears in the above-identified patent and that said Letters Patent is hereby corrected as shown below:

Column 10
    Line 2, "group $D_2$" should read --group $D_2$,--;
    Line 3, "pages - of originals each image" should read
        --pages [1]-[4] of originals each having image--;
    Line 32, "an" should read --a--.

Column 13
    Line 5, "to" should read --the--;
    Line 7, "motor 16" should read --motor 106--;
    Line 31, "is" should read --are--.

Column 15
    Line 39, "reversed" should read --reserved--;
    Line 44, "said stack" should read --said second stack--.

Column 26
    Line 49, "the" should read --said--.

Signed and Sealed this

Fifth Day of July, 1994

BRUCE LEHMAN

Attest:

Attesting Officer      Commissioner of Patents and Trademarks